US012435707B2

(12) United States Patent
Raney et al.

(10) Patent No.: US 12,435,707 B2
(45) Date of Patent: Oct. 7, 2025

(54) EMBODIED LOGIC AND ACTUATION CONTROL IN SOFT, STIMULI-RESPONSIVE STRUCTURES POISED NEAR BIFURCATION POINTS

(71) Applicant: THE TRUSTEES OF THE UNIVERSITY OF PENNSYLVANIA, Philadelphia, PA (US)

(72) Inventors: Jordan R. Raney, Glenside, PA (US); Lucia Korpas, Philadelphia, PA (US); Yijie Jiang, Corinth, TX (US)

(73) Assignee: The Trustees of the University of Pennsylvania, Philadelphia, PA (US)

(*) Notice: Subject to any disclaimer, the term of this patent is extended or adjusted under 35 U.S.C. 154(b) by 963 days.

(21) Appl. No.: 17/040,237

(22) PCT Filed: Apr. 2, 2019

(86) PCT No.: PCT/US2019/025356
§ 371 (c)(1),
(2) Date: Sep. 22, 2020

(87) PCT Pub. No.: WO2019/195266
PCT Pub. Date: Oct. 10, 2019

(65) Prior Publication Data
US 2021/0363976 A1 Nov. 25, 2021

Related U.S. Application Data

(60) Provisional application No. 62/651,884, filed on Apr. 3, 2018.

(51) Int. Cl.
F03G 7/00 (2006.01)
B29C 64/118 (2017.01)
(Continued)

(52) U.S. Cl.
CPC ............. *F03G 7/008* (2021.08); *B32B 3/266* (2013.01); *C09D 183/04* (2013.01);
(Continued)

(58) Field of Classification Search
CPC ...... B32B 3/266; C08K 7/14; B29K 2033/26; B29K 2083/00; B29K 2105/0061;
(Continued)

(56) References Cited

U.S. PATENT DOCUMENTS 3,576,552 A    4/1971 Vinal
2008/0075930 A1 3/2008 Kornbluh et al.
(Continued)

FOREIGN PATENT DOCUMENTS

DE    19823690 C1 *  1/2000    ......... H01H 59/0009
WO    2015/160717 A1  10/2015

OTHER PUBLICATIONS

Meaud "Tuning elastic wave propagation in multistable architected materials." International Journal of Solids and Structures 122-123 (2017) 69-80 (Year: 2017).*
(Continued)

Primary Examiner — Tri V Nguyen
(74) Attorney, Agent, or Firm — BakerHostetler

(57) ABSTRACT

Provided are devices and methods that combine material anisotropy with nonlinear structural design to produce structures that precisely and sequentially actuate in response to multiple stimuli, such as water or non-polar solvents. These devices and methods can include bistable anisotropic elements that convert to monostable element upon exposure to a particular stimulus, and anisotropic distortions can be harnessed to change the geometric properties of the element to cross phase boundaries and trigger shape changes at precise times. One can incorporate complex logic into these devices and methods.

25 Claims, 24 Drawing Sheets

(51) Int. Cl.

| | |
|---|---|
| B29K 33/00 | (2006.01) |
| B29K 83/00 | (2006.01) |
| B29K 105/00 | (2006.01) |
| B29K 309/08 | (2006.01) |
| B29K 401/00 | (2006.01) |
| B32B 3/26 | (2006.01) |
| B33Y 80/00 | (2015.01) |
| C08K 7/14 | (2006.01) |
| C09D 183/04 | (2006.01) |
| H10N 30/20 | (2023.01) |

(52) U.S. Cl.
CPC ......... *B29C 64/118* (2017.08); *B29K 2033/26* (2013.01); *B29K 2083/00* (2013.01); *B29K 2105/0061* (2013.01); *B29K 2309/08* (2013.01); *B29K 2401/00* (2013.01); *B33Y 80/00* (2014.12); *C08K 7/14* (2013.01); *F03G 7/029* (2021.08); *H10N 30/204* (2023.02)

(58) Field of Classification Search
CPC ..... C09D 183/04; C08G 77/04; C08F 120/56; F03G 7/008; H10N 30/204
USPC ......................................... 428/323
See application file for complete search history.

(56) References Cited

U.S. PATENT DOCUMENTS

| | | | |
|---|---|---|---|
| 2010/0201930 A1* | 8/2010 | Nakata ............... | C09K 19/42 252/299.61 |
| 2013/0123371 A1 | 5/2013 | Wan et al. | |

OTHER PUBLICATIONS

Artusio-Glimpse "The Realization and Study of Optical Wings." Proquest Ph.D dissertations database. (Year: 2016).*
Malek S. et al., "Lightweight 3d cellular composites inspired by balsa," Bioinspiration & Biomimetics, vol. 12, Issue 2, 2017, 026014, pp. 1-11.
Marchese A. D. et al, "Autonomous soft robotic fish capable of escape maneuvers using fluidic elastomer actuators," Soft Robotics, vol. 1, Issue 1, 2014, pp. 75-87.
Marklund E. et al, "Modeling the effect of helical fiber structure on wood fiber composite elastic properties," Appl Compos Mater, vol. 16, 2009, pp. 245-262.
Martin J. J. et al, "Designing bioinspired composite reinforcement architectures via 3d magnetic printing," Nat Comm, vol. 6, 2015, 8641, pp. 1-7.
McEvoy M. A. et al, "Materials that couple sensing, acuation, computation, and communication," Science, vol. 347, Issue (6228), 2015, 1328, pp. 1-8.
Misra A. et al, "Synthesis and characterization of carbon nanotube multilayer structures," ACS Nano, vol. 5, Issue 10, 2011, pp. 7713-7721.
Momeni et al., "A review of 4D printing", Materials & Design, vol. 122, 2017, pp. 42-79.
Mora T. et al., "Are biological systems poised at criticality?," J Stat Phys, vol. 144, 2011, pp. 268-302.
Morales, D. et al, "Ionoprinted multi-responsive hydrogel actuators," Micromachines, vol. 7, Issue 98, (2016), pp. 1-15.
Mu J. et al., "Origami-inspired active graphenebased paper for programming instant self-folding walking devices," Science Advances, vol. 1, Issue 10, 2015, e1500533, pp. 1-8.
Na et al., "Programming reversibly self-folding origami with micropatterned photo-crosslinkable polymer trilayers", Adv. Mater., Jan. 7, 2015, vol. 27, No. 1, pp. 79-85.
Nadkarni N. et al, "A universal kinetic energy transport law for dissipative and diffusive phase transitions," Phys. Rev. B, vol. 93, 2016, 104109, pp. 1-7.
Nadkarni N. et al, "Dynamics of periodic mechanical structures containing bistable elastic elements: From elastic to solitary wave propagation," Phys. Rev. E, vol. 90, 023204, 2014, pp. 1-13.
Nadkarni N. et al, "Unidirectional transition waves in bistable lattices," Phys. Rev. Lett., vol. 116, 2016, 244501, pp. 1-5.
Nardinocchi P. et al., "Anisotropic swelling of thin gel sheets," Soft Matter, vol. 11, 2015, pp. 1492-1499.
Nesterenko V. F, "Propagation of nonlinear compression pulses in granular media," J Appl Mech Tech Phys, vol. 24, Issue 5, 1983, pp. 733-743.
Nolan D. R. et al, "A robust anisotropic hyperelastic formulation for the modelling of soft tissue," J. Mech. Behav. Biomed. Mater., vol. 39, 2014, pp. 48-60.
Norman A. D. et al, "Novel multistable corrugated structures," 48th AIAA/ASME/ASCE/AHS/ASC Structures, Structural Dynamics, and Materials Conference, vol. 48, 2007, 2228, pp. 1-12.
Oh Y. S. et al, "Synthesis of multistable equilibrium compliant mechanisms using combinations of bistable mechanisms," Journal of Mechanical Design, vol. 131, 2009, 021002.
Oosten et al., "Printed artificial cilia from liquid crystal network actuators modularly driven by light", nature materials, vol. 8, No. 8, 2009, pp. 677-682.
Overvelde .J.T.B. et al, "A three-dimensional actuated origami-inspired transformable metamaterial with multiple degrees of freedom," Nat. Comm., vol. 7, 2016, 10929, pp. 1-8.
Overvelde J. T. B. et al, "Rational design of recon-gurable prismatic architected materials," Nature, vol. 541, 2017, pp. 347-352.
Overvelde J. T. B.et al, "Amplifying the response of soft actuators by harnessing snap-through instabilities," PNAS, vol. 112, Issue 35, 2015, pp. 10863-10868.
Pandey A. et al, "Dynamics of snapping beams and jumping poppers," EPL-Europhys. Lett., vol. 105, Issue 2, 2014, 24001, pp. 1-23.
Pathak S. et al, "Effect of morphology on the strain recovery of vertically aligned carbon nanotube arrays: an in situ study,". Carbon, vol. 63, 2013, pp. 303-316.
Pelrine et al., "High-Speed Electrically Actuated Elastomers with Strain Greater Than 100%", Science, vol. 287, Issue 5454, Feb. 4, 2000, pp. 836-839.
Pendleton T. M. et al, "Development of a tristable compliant mechanism," 12th World Congress in Mechanism and Machine Science, vol. 12, Issue 1, 2007.
Peraza-Hernandez E. A. et al, "Origami-inspired active structures: a synthesis and review," Smart Mater. Struct., vol. 23, 2014, 094001, pp. 1-50.
Puglisi G. et al, "Mechanics of discrete chain with bi-stable elements," J. Mech. Phys. Solids, vol. 48, 2000, pp. 1-27.
Puglisi G. et al, "Rate independent hysteresis in a bi-stable chain," J. Mech. Phys. Solids, vol. 50, 2002, pp. 165-187.
Qing H. et al, "3d hierarchical computational model of wood as a cellular material with fibril reinforced, heterogeneous multiple layers," Mechanics of Materials, vol. 41, 2009, pp. 1034-1049.
Rafsanjani A. et al, "Snapping mechanical metamaterials under tension," Advanced Materials, vol. 27, 2015, pp. 5931-5935.
Rafsanjani et al., "Hydro-responsive curling of the resurrection plant Selaginella lepidophylla", Scientific Reports, vol. 5, No. 1, Jan. 2015, pp. 8064.
Raney J. R. et al, "Modeling and in situ identification of material parameters for layered structures based on carbon nanotube arrays," Composite Structures, vol. 93, Issue 11, 2011, pp. 3013-3018.
Raney J. R.,et al, "Rotational 3d printing of bioinspired, damage-tolerant materials with programmable mechanics," Proc. Natl. Acad. Sci., vol. 115, Issue 6, 2018, pp. 1198-1203.
Raney J. R.et al, "Tailoring the microstructure and mechanical properties of arrays of aligned multiwall carbon nanotubes by utilizing different hydrogen concentrations during synthesis," Carbon, vol. 49, Issue 11, 2011, pp. 3631-3638.
Raney, J. R. et al, "Stable propagation of mechanical signals in soft media using stored elastic energy," Proc. Natl. Acad. Sci, vol. 113, 2016, pp. 9722-9727.
Raney, J. R.et al, "Printing mesoscale architectures," MRS Bull, vol. 40, 2015, 943-950.

(56) References Cited

OTHER PUBLICATIONS

Raney J. R. et al, "Rate-independent dissipation and loading direction effects in compressed carbon nanotube arrays," Nanotechnology, vol. 24, , 2013, 255707, pp. 1-10.
Raviv, D. et al, "Active printed materials for complex self-evolving deformations," Sci. Rep, vol. 4, 2014, 7422, pp. 1-8.
Reiterer A. et al, "Experimental evidence for a mechanical function of the cellulose microfibril angle in wood cell walls," Philosophical Magazine A, vol. 79, Issue 9, 1999, pp. 2173-2184.
Restrepo, D. et al, "Phase transforming cellular materials," Extrem. Mech. Lett, vol. 4, 2015, pp. 52-60.
Reyssat et al., "Hygromorphs: from pine cones to biomimetic bilayers", Journal of The Royal Society Interface, vol. 6, No. 39, Oct. 6, 2009, pp. 951-957.
Rodriguez J. N. et al, "Shape-morphing composites with designed micro-architectures," Scientific Reports, vol. 6, 2016, 27933, pp. 1-10.
Rogoz et al., "Light-Driven Soft Robot Mimics Caterpillar Locomotion in Natural Scale", Advanced Optical Materials, vol. 4, No. 11, Nov. 2016, pp. 1902-1902.
Roy D. et al, "Future perspectives and recent advances in stimuli-responsive materials," Progress in Polymer Science, vol. 35, Issue 1-2, 2010, pp. 278-301.
Shan, S. et al, "Multistable Architected Materials for Trapping Elastic Strain Energy," Adv. Mater, vol. 27, 2015, pp. 4296-4301.
Shankar et al., "Contactless, photoinitiated snap-through in azobenzene-functionalized polymers", Proceedings of the National Academy of Sciences, vol. 110, No. 47, Nov. 2013, pp. 18792-18797.
Shepherd R. F. et al, "Multigait soft robot," PNAS, vol. 108, Issue 51, 2011, pp. 20400-20403.
Shim et al., "Controlled origami folding of hydrogel bilayers with sustained reversibility for robust microcarriers", Angew. Chemie—Int. Ed., vol. 51, No. 6, Feb. 2012, pp. 1420-1423.
Shofner ML et al, "Nanofiber-reinforced polymers prepared by fused deposition modeling," Journal of applied polymer science, vol. 89, Issue 11, 2003, pp. 3081-3090.
Silva A. Da et al, "Compressive response and failure of balsa wood," International Journal of Solids and Structures, vol. 44, 2007, pp. 8685-8717.
Silverberg J. L. et al, "Origami structures with a critical transition to bistability arising from hidden degrees of freedom," Nat. Mater., vol. 14, Issue 4, 2015, pp. 389-393.
Silverberg J. L. et al, "Using origami design principles to fold reprogrammable mechanical metamaterials," Science, vol. 345, Issue 6197, 2014, pp. 647-650.
Singh G. et al, "An isoperimetric formulation to predict deformation behavior of pneumatic fiber reinforced elastomeric actuators," IEEE-RSJ International Conference on Intelligent Robots and Systems, 2015, pp. 1738-1743.
Skotheim et al., "Physical Limits and Design Principles for Plant and Fungal Movements", Science, vol. 308, No. 5726, May 27, 2005, pp. 1308-1310.
Smay J. E. et al, "Colloidal inks for directed assembly of 3d periodic structures," Langmuir, vol. 18, Issue 14, 2002, pp. 5429-5437.
Smith M. L. et al., "Designing light responsive bistable arches for rapid, remotely triggered actuation," Proc. of SPIE, vol. 9058, 2014, 90580F.
Song K. et al, "Journey of water in pine cones," Scientific Reports, vol. 5, 2015, pp. 1-8.
Spadoni A. et al, "Generation and control of sound bullets with a nonlinear acoustic lens," PNAS, vol. 107, Issue 16, 2010, pp. 7230-7234.
Stoychev, G. et al, "Hole-Programmed Superfast Multistep Folding of Hydrogel Bilayers," Adv. Funct. Mater, vol. 26, 2016, pp. 7733-7739.
Stuart et al., "emerging applications of stimuli-responsive polymer materials", Nature Materials, vol. 9, Feb. 2010, pp. 101-113.
Studart et al., "Bioinspired materials that self-shape through programmed microstructures", Soft Matter, vol. 10, No. 9, 2014, pp. 1284-1294.

Tavakol B. et al, "Voltage-induced buckling of dielectric lms using uid electrodes," Applied Physics Letters, vol. 108, 2016, 112901, pp. 1-5.
Tekinalp H.L et al, "Highly oriented carbon fiber-polymer composites via additive manufacturing," Composites Science and Technology, vol. 105, 2014, pp. 144-150.
Therien-Aubin, H. et al, "Multiple shape transformations of composite hydrogel sheets," J. Am. Chem. Soc, vol. 135, 2013, pp. 4834-4839.
Thevamaran R. et al, "Multiscale mass-spring model for high-rate compression of vertically aligned carbon nanotube foams," Journal of Applied Mechanics, vol. 81, 2014, 121006, pp. 1-6.
Timoshenko S. P. "Buckling of flat curved bars and slightly curved plates," J. Appl. Mech., vol. 2, 1935, pp. A17-A29.
Tolley M.T. et al, "A resilient, untethered soft robot," Soft Robotics, vol. 1, Issue 3. 2014, pp. 213-223.
Ueda M. et al, "Trap-closing chemical factors of the venus flytrap (*Dionaea muscipulla ellis*)," ChemBioChem, vol. 11, 2010, pp. 2378-2383.
Valdeolivas et al., "4D Printed Actuators with Soft-Robotic Functions", Macromol. Rapid Commun., vol. 39, No. 5, Dec. 2017, 1700710, pp. 1-7.
Volkov et al., "Kinetics and Mechanism of Dionaea muscipula Trap Closing", Plant Physiology, vol. 146, No. 2, Feb. 2008, pp. 694-702.
Wang, P. et al, "Harnessing buckling to design tunable locally resonant acoustic metamaterials," Phys. Rev. Lett, vol. 113, 2014, 14301, pp. 1-11.
Wani et al., "A light-driven artificial flytrap", Nature Communications, vol. 8, No. 15546, May 23, 2017, pp. 1-7.
Weaver J. C. et al, "The stomatopod dactyl club: a formidable damage-tolerant biological hammer," Science, vol. 336, 2012, pp. 1275-1280.
Wehner et al., "An integrated design and fabrication strategy for entirely soft, autonomous robots", Nature, Aug. 25, 2016, vol. 536, No. 7617, pp. 451-455.
Wehner, M. et al, "Pneumatic Energy Sources for Autonomous and Wearable Soft Robotics," Soft Robot, vol. 1, 2014, pp. 263-274.
White et al., "Programmable and adaptive mechanics with liquid crystal polymer networks and elastomers", nature materials, Nov. 2015, vol. 14, No. 11, pp. 1087-1098.
White T. J., et al, "Topography from topology: photoinduced surface features generated in liquid crystal polymer networks," Adv. Mater., vol. 25, 2013, pp. 5880-5885.
Wu et al., "Programmable Deployment of Tensegrity Structures by Stimulus-Responsive Polymers", Sci. Rep., vol. 7, No. 1, 3511, pp. 1-8.
Wu Z. et al, "Exploring a modular adaptive metastructure concept inspired by muscle's cross-bridge," Journal of Intelligent Material Systems and Structures, vol. 27, Issue 9, 2016, pp. 1189-1202.
Wu, J. et al., "Multi-shape active composites by 3D printing of digital shape memory polymers," Sci. Rep, vol. 6, 2016, 24224, pp. 1-11.
Yan X. et al, "Stimuli-responsive supramolecular polymeric materials," Chem. Soc. Rev., vol. 41, 2012, pp. 6042-6065.
Yang D. et al, "Buckling of elastomeric beams enables actuation of soft machines," Adv. Mater., vol. 27, Issue 41, 2015, pp. 6323-6327.
Yang D. et al, "Phase-transforming and switchable metamaterials," Extreme Mechanics Letters, vol. 6, 2016, pp. 1-9.
Yang R. et al., "A mathematical model on the closing and opening mechanism for Venus flytrap", Plant Signaling & Behavior, vol. 5, Issue 8, Aug. 2010, pp. 968-978.
Yang, X. et al, "Bio-Inspired Fast Actuation by Mechanical Instability of Thermoresponding Hydrogel Structures," J. Appl. Mech, vol. 83, 2018, 71005.
Zeng et al., "Light Robots: Bridging the Gap between Microrobotics and Photomechanics in Soft Materials", Advanced Materials, vol. 30, No. 24, 2018, 703554, pp. 1-9.
Zeng et al., "Self-Regulating Iris Based on Light-Actuated Liquid Crystal Elastomer", Adv. Mater., vol. 29, No. 30, Jun. 2017, pp. 1701814.
Zhang Q. et al, "Origami and kirigami inspired self-folding for programming three-dimensional shape shifting of polymer sheets with light," Extreme Mechanics Letters, vol. 11, 2017, pp. 111-120.

(56) References Cited

OTHER PUBLICATIONS

Zhang K. et al, "Biomimetic study on helical fiber composites," J. Mater. Sci. Technol., vol. 14, 1998, pp. 29-32.
Zhang, X. et al, "Optically- and thermally-responsive programmable materials based on carbon nanotube-hydrogel polymer composites," Nano Lett, vol. 11, 2011, pp. 3239-3244.
Zhu C. et al., "Supercapacitors based on three-dimensional hierarchical graphene aero-gels with periodic macropores," Nano Letters, vol. 16, Issue 6, 2016, pp. 3448-3456.
Abdullah, A. M.et al, "Programmable shape transformation of elastic spherical domes," Soft Matter, vol. 12, 2016, pp. 6184-6195.
Abraham Y. et al, "Tilted cellulose arrangement as a novel mechanism for hygroscopic coiling in the stork's bill awn," J. R. Soc. Interface, vol. 9, 2012, pp. 640-647.
Ahn B. Y. et al, "Omnidirectional printing of flexible, stretchable, and spanning silver microelectrodes," Science, vol. 323, 2009, pp. 1590-1593.
Alexander, M.et al, "Membrane introduction proton-transfer reaction mass spectrometry," Int. J. Mass Spectrom, 2003, pp. 67-70.
Ambulo et al., "Four-dimensional Printing of Liquid Crystal Elastomers", ACS Applied Materials & Interfaces, vol. 9, No. 42, Oct. 2017, pp. 37332-37339.
Apichattrabrut T. et al, "Helicoidal composites," Mechanics of Advanced Materials and Structures, vol. 13, 2006, pp. 61-76.
Armon S. et al, "Geometry and mechanics in the opening of chiral seed pods.," Science, vol. 333, 2011, pp. 1726-1730.
Bakarich et al., "4D printing with mechanically robust, thermally actuating hydrogels", Macromol. Rapid Commun., vol. 36, Issue 12, 2015, pp. 1211-1217.
Bell J. P., "Flow orientation of short fiber composites," Journal of Composite Materials, vol. 3, Issue 2, 1969, pp. 244-253.
Bellmann C. et al, "Humidity micro switch based on humidity-sensitive polymers," Proc. of SPIE, vol. 9430, 2015, 94302F, pp. 1-10.
Bende N. P. et al, "Geometrically controlled snapping transitions in shells with curved creases," PNAS, vol. 112, 2015, 2015, pp. 11175-11180.
Bertoldi, K.et al, "Flexible mechanical metamaterials," Nat. Rev. Mater, vol. 2, 2017, 17066, pp. 1-31.
Bishop-Moser J. et al, "Design and modeling of generalized fiber-reinforced pneumatic soft actuators," IEEE Transactions on Robotics, vol. 31, Issue 3, 2015, pp. 536-545.
Blesgen T. et al, "Continuum limits of bistable spring models of carbon nanotube arrays accounting for material damage," Mechanics Research Communications, vol. 45, 2012, pp. 58-63.
Blesgen T. et al, "Multiscale mass-spring models of carbon nanotube arrays accounting for mullins-like behavior and permanent deformation," Multiscale Modeling and Simulation, vol. 11, Issue 2, 2013, pp. 545-565.
Boechler N. et al, "Bifurcation-based acoustic switching and rectification," Nature Materials, vol. 10, 2011, pp. 665-668.
Boothby et al., "Shape changes in chemoresponsive liquid crystal elastomers", Sensors and Actuators B: Chemical, vol. 240, Mar. 2017, pp. 511-518.
Boothby, J. M.et al., "Dual-responsive, shape-switching bilayers enabled by liquid crystal elastomers," Soft Matter, vol. 13, 2017, pp. 4349-4356.
Burgert et al., "Actuation systems in plants as prototypes for bioinspired devices", Phil. Trans. R. Soc. A., May 2009, pp. 1541-1557.
Calvert P et al, "Extrusion freeform fabrication of chopped-fibre reinforced composites," High Performance Polymers, vol. 9, Issue 4, 1997, pp. 449-456.
Camacho-Lopez M. et al, "Fast liquid-crystal elastomer swims into the dark," Nat. Mat., vol. 3, 2004, pp. 307-310.
Cao et al., "Untethered soft robot capable of stable locomotion using soft electrostatic actuators", Extreme Mechanics Letters, vol. 21, 20188, pp. 9-16.
Carpi F. et al, "Bioinspired tunable lens with muscle-like electroactive elastomers," Adv. Funct. Mater., vol. 21, 2011, pp. 4152-4158.
Chao, K. P.et al, "Estimation of effective diffusion coefficients for benzene and toluene in PDMS for direct solid phase microextraction," Polym. Test, vol. 30, 2011, pp. 501-508.
Che, K.et al, "Three-DimensionalPrinted Multistable Mechanical Metamaterials With a Deterministic Deformation Sequence," J. Appl. Mech, vol. 84, 2016, 11004, pp. 1-10.
Chebbi E. et al, "An anisotropic hyperelastic constitutive model for short glass fiber-reinforced polyamide," International Journal of Engineering Science, vol. 106, 2016, pp. 262-272.
Chen B. G. et al, "Nonlinear conduction via solitons in a topological mechanical insulator," PNAS, vol. 111, Issue 36, 2014, pp. 13004-13009.
Chen B. G.-G. et al, "Topological mechanics of origami and kirigami," Phys. Rev. Lett., vol. 116, Issue 13, 2016, 135501, pp. 1-11.
Chen T, et al, "An Autonomous Programmable Actuator and Shape Reconfigurable Structures using Bistability and Shape Memory Polymers," 3D Printing and Additive Manufacturing, vol. 5, Issue 2, 2017, pp. 91-101.
Chen T. et al, "Harnessing bistability for directional propulsion of untethered, soft robots," 2017, pp. 1-20.
Chen T.et al, "Integrated design and simulation of tunable, multistate structures fabricated monolithically with multi-material 3d printing," Scientific Reports, vol. 7, 2017, 45671, pp. 1-8.
Chen Y. et al, "Lattice metamaterials with mechanically tunable poisson's ratio for vibration control," Phys. Rev. Applied, vol. 7, 024012, 2017, pp. 1-11.
Clausen A. F. et al, "Topology optimized architectures with programmable poisson's ratio over large deformations," Adv. Mater., vol. 27, 2015, pp. 5523-5527.
Coburn B. H. et al, "Tristability of an orthotropic doubly curved shell," Composite Structures, vol. 96, 2013, pp. 446-454.
Compton, B. G.et al, "3D-Printing ofLightweight Cellular Composites," Adv. Mater, vol. 26, 2014, pp. 5930-5935.
Connolly F. et al, "Automatic design of fiber-reinforced soft actuators for trajectory matching," Proc. Natl. Acad. Sci., vol. 114, Issue 1, 2017, pp. 51-56.
Correa D. M. et al, "Negative stiffness honeycombs for recoverable shock isolation," Rapid Prototyping J., vol. 21, 2015, 2015, pp. 702-713.
Correa, D. M.et al, "Mechanical design of negative stiffness honeycomb materials," Integr. Mater. Manuf. Innov, vol. 4, Issue 10 (2015), pp. 165-175.
Davis D. et al, "Self-folding of polymer sheets using microwaves and graphene ink," RSC Adv., vol. 5, 2015, 89254.
Devaux T. et al, "Asymmetric acoustic propagation of wave packets via the self-demodulation effect," Phys. Rev. Lett., vol. 115, 2015, 234301, pp. 1-5.
Diaconu C. G. et al, "Concepts for morphing airfoil sections using bi-stable laminated composite structures," Thin-Walled Structures, vol. 46, 2008, pp. 689-701.
Duoss E. B. et al, "Three-dimensional printing of elastomeric, cellular architectures with negative stiffness," Adv. Funct. Mater., vol. 24, Issue 31, 2014, pp. 4905-4913.
Eberl C. et al, "Mechanical characterization of coatings using microbeam bending and digital image correlation techniques," Experimental Mechanics, vol. 50, 2010, pp. 85-97.
Eddington D. T. et al, "An organic self-regulating micro uidic system," Lab Chip, vol. 1, Issue 2, 2001, pp. 96-99.
Elbaum et al., "The Role of Wheat Awns in the Seed Dispersal Unit", Science, vol. 316, No. 5826, Jun. 2007, pp. 884-886.
Erb R. M. et al, "Self-shaping composites with programmable bioinspired microstructures," Nat. Comm., vol. 4, 2013, 1712, pp. 1-8.
Fargette A. et al, "Elastocapillary snapping: Capillarity induces snap-through instabilities in small elastic beams," Phys. Rev. Lett., vol. 112, 2014, 137802, pp. 1-5.
Farkash M., et al, "Whisker alignment by slip extrusion," Materials Science and Engineering A, vol. 177, Issue 1, 1994, pp. 269-275.
Felton S. et al, "A method for building self-folding machines," Science, vol. 345, Issue 6197, 2014, pp. 644-646.

(56) References Cited

OTHER PUBLICATIONS

Fereidoonnezhad B. et al, "A hyperelastic constitutive model for fiber-reinforced rubber-like materials," International Journal of Engineering Science, vol. 71, 2013, pp. 36-44.

Fernandes et al., "Self-folding polymeric containers for encapsulation and delivery of drugs", Advanced Drug Delivery Reviews, vol. 64, Issue 14, Nov. 2012, pp. 1579-1589.

Florijn B. et al, "Programmable mechanical metamaterials," Phys. Rev. Lett., vol. 113, 2014, 175503, pp. 1-5.

Forterre Y et al., "How the Venus flytrap snaps", Nature, vol. 433, Jan. 27, 2005, pp. 421-425.

Fraternali F et al, "Solitary waves on tensegrity lattices," Journal of the Mechanics and Physics of Solids, vol. 60, Issue 6, 2012, pp. 1137-1144.

Fraternali F. et al, "Modeling microscale instabilities in compressed carbon nanotube bundles using multistable spring models," Composite Structures, vol. 96, Issue 1, 2013, pp. 745-750.

Fraternali F. et al, "Multiscale mass-spring models of carbon nanotube foams," J. Mech. Phys. Solids, vol. 59, 2011, pp. 89-102.

Frenzel T. et al, "Tailored buckling microlattices as reusable lightweight shock absorbers," Advanced Materials, vol. 28, Issue 28, Jul. 27, 2016, pp. 5865-5870.

Galloway K. C. et al, "Mechanically programmable bend radius for fiber-reinforced soft actuators," Int. Conf. Adv. Robot, 2013.

Ge et al., "Active materials by four-dimension printing", Appl. Phys. Lett., vol. 103, Jun. 24, 2013, pp. 131901-131905.

Ge Q. et al, "Active origami by 4d printing," Smart Mater.Struct., vol. 23, Issue 9, 2014, 094007.

Gladman, A. S.et al, "Biomimetic 4D printing," Nat. Mater, vol. 15, 2016. pp. 413-418.

Gratson G. M.et al, "Direct writing of three-dimensional webs," Nature, vol. 428, 2004, p. 386.

Guest S. et al, "Analytical models for bistable cylindrical shells," Proc. R. Soc. London A, vol. 462, 2006, 2006, pp. 839-854.

Guo Q. et al, "Fast nastic motion of plants and bioinspired structures," J. R. Soc. Interface, vol. 12, 2015, pp. 1-14.

Guo Q. et al, "Modeling bistable behaviors in morphing structures through finite element simulations," Biomed Mater Eng, vol. 24, Issue 1, 2014, pp. 557-562.

Ha C. S. et al, "Chiral three-dimensional lattices with tunable poisson's ratio," Smart Mater. Struct., vol. 25, 054005, 2016, pp. 1-11.

Haghpanah B. et al, "Multistable shape-reconfigurable architected materials," Adv. Mater., vol. 28, 2016, pp. 7915-7920.

Haghpanah B. et al, "Programmable elastic metamaterials," Adv. Eng. Mater., vol. 18, Issue 4, 2016, pp. 643-649.

Halpin, J. C, "Effects ofEnvironmental Factors on Composite Materials," Tech. Rep. Afml-Tr-67-423 (1969).

Halpin, J. C.et al, "The Halpin-Tsai equations: A review," Polym. Eng. Sci, vol. 16, 1976, pp. 344-352.

Harne R. L. et al, "Prospects for nonlinear energy harvesting systems designed near the elastic stability limit when driven by colored noise," Journal of Vibration and Acoustics, vol. 136, 2014, 021009.

Harne R. L. et al, "Wave heave energy conversion using modular multistability," Applied Energy, vol. 130, 2014, pp. 148-156.

Holmes D.P. et al, "Snapping surfaces," Adv. Mater., vol. 19, Issue 21, 2007, pp. 3589-3593.

Holzapfel, G. A.et al, "A new constitutive framework for arterial wall mechanics and a comparative study of material models," J. Elast, vol. 61, 2000, pp. 1-48.

Hu, N. et al, "Buckling-induced smart applications: Recent advances and trends," Smart Mater. Struct, vol. 24, 2015, 63001, pp. 1-20.

Hubbard et al., "Controllable Curvature from Planar Polymer Sheets in Response to Light", Soft Matter, vol. 13, No. 12, Feb. 2017, pp. 2299-2308.

Jeon et al., "Shape-Morphing Materials from Stimuli-Responsive Hydrogel Hybrids", Acc. Chem. Res., Feb. 21, 2017, vol. 50, No. 2, pp. 161-169.

Jin et al., "Programming a crystalline shape memory polymer network with thermo- and photo-reversible bonds toward a single-component soft robot", Science Advances, vol. 4, No. 1, pp. 1-6.

Jin L. et al, "Bifurcation diagrams for the formation of wrinkles or creases in soft bilayers," Journal of Applied Mechanics, vol. 82, 2015, 061008.

Kagaya K. et al, "Feed-forward motor control of ultrafast, ballistic movements," Journal of Experimental Biology, vol. 219, 2016, pp. 319-333.

Kang, S. H. et al, "Complex ordered patterns in mechanical instability induced geometrically frustrated triangular cellular structures," Phys. Rev. Lett, vol. 112, 2014, pp. 1-5.

Keplinger C. et al, "Harnessing snap-through insta-bility in soft dielectrics to achieve giant voltage-triggered deformation," Soft Matter, vol. 8, 2012, pp. 285-288.

Ko et al., "Smart Actuators and Adhesives for Reconfigurable Matter", Acc. Chem. Res., 2017, vol. 50, No. 4, pp. 691-702.

Kochmann, D.et al, "Exploiting microstructural instabilities in solids and structures: from metamaterials to structural transitions," Appl. Mech. Rev, vol. 69, (2017), pp. 1-24.

Kolesky D. B. et al, "3d bioprinting of vascularized, heterogeneous cell-laden tissue constructs," Advanced Materials, vol. 26, 2014, pp. 3124-3130.

Konya A. et al, "Modeling defects, shape evolution, and programmed auto-origami in liquid crystal elastomers," Frontiers in Materials, vol. 3, Issue 24, 2016, pp. 1-7.

Kotikian et al., "3D Printing of Liquid Crystal Elastomeric Actuators with Spatially Programed Nematic Order", Adv. Mater., vol. 30, No. 10, 2018, 1706164, pp. 1-6.

Kuder I. K. et al, "Variable stiffness material and structural concepts for morphing applications," Progress in Aerospace Sciences, vol. 63, 2013, pp. 33-55.

Launey M. E. et al, "On the mechanistic origins of toughness in bone," Annu. Rev. Mater. Res., vol. 40, 2010, pp. 25-53.

Lee, H., et al, "Firstjump ofmicrogel; actuation speed enhancement by elastic instability," Soft Matter, vol. 6, 2010, pp. 4342-4345.

Lee, H.et al, "Prescribed pattern transformation in swelling gel tubes by elastic instability," Phys. Rev. Lett, vol. 108, 2012, 214304, pp. 1-32.

Lee, J. N.et al, "Solvent compatibility of poly (dimethylsiloxane)-based microfluidic devices," Anal. Chem, vol. 75, 2003, pp. 6544-6554.

Leong et al., "Tetherless thermobiochemically actuated microgrippers", Proc. Natl. Acad. Sci., vol. 106, No. 3, Jan. 20, 2009, pp. 703-708.

Lewis, J. A, "Direct ink writing of 3D functional materials," Adv. Funct. Mater, vol. 16, 2006, pp. 2193-2204.

Li F. et al, "Granular acoustic switches and logic elements," Nature Communications, vol. 5, 2014, 5311, pp. 1-6.

Li Y., et al, "Photoresponsive liquid crystalline epoxy networks with shape memory behavior and dynamics ester bonds," ACS Applied Materials & Interfaces, vol. 8, 2016, pp. 15750-15757.

Liang B. et al, "An acoustic rectier," Nature Materials, vol. 9, 2010, pp. 989-992.

Liang X. et al, "Drying-induced deformation in fiber-embedded gels to mimic plant nastic movements," International Journal of Applied Mechanics, vol. 7, Issue 2, 2015, 1550016, pp. 1-11.

Lind J. U. et al, "Instrumented cardiac microphysiological devices via multimaterial three-dimensional printing," Nature Materials, advanced online, vol. 1, 2016, pp. 303-308.

Lum et al., "Soft Actuators for Small-Scale Robotics", Advanced Materials, vol. 29, No. 13, Apr. 4, 2017, pp. 1603483.

\* cited by examiner

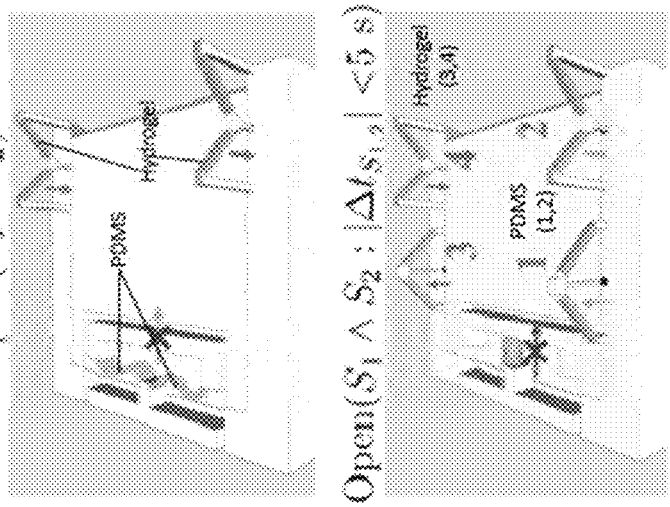
FIG. 8B
FIG. 8C
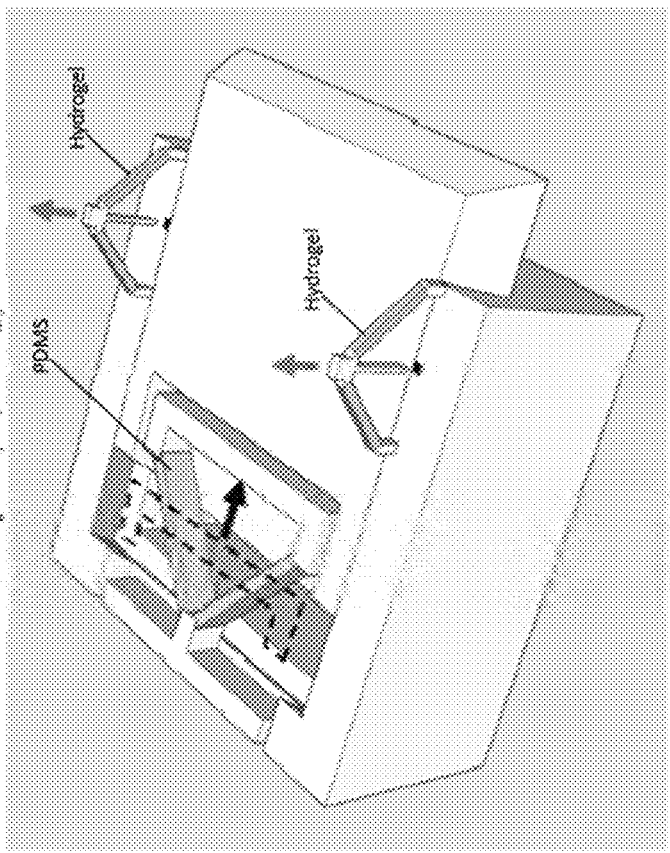
FIG. 8A

EMBODIED LOGIC AND ACTUATION CONTROL IN SOFT, STIMULI-RESPONSIVE STRUCTURES POISED NEAR BIFURCATION POINTS

CROSS-REFERENCE TO RELATED APPLICATIONS

This application is the National Stage Application of International Patent Application No. PCT/US2019/025356, filed Apr. 2, 2019, which claims priority to and the benefit of U.S. Patent Application No. 62/651,884, "Embodied Logic And Actuation Control In Soft, Stimuli-Responsive Structures Poised Near Bifurcation Points" (filed Apr. 3, 2018), which foregoing applications are incorporated herein by reference in their entireties for any and all purposes.

GOVERNMENT RIGHTS

This invention was made with government support under grant number W911NF-17-1-0147 awarded by the Army Research Office. The government has certain rights in the invention.

TECHNICAL FIELD

The present disclosure relates to the field of metamaterials.

BACKGROUND

Soft materials are widely used in many mechanics applications as well as in microfluidics, soft robotics, and medicine. Control of their shape is, however, difficult; past strategies include integration of rigid electronics, power sources, pneumatic actuation, or other active materials that can be slow or of limited actuation force.

Accordingly, there is a long-felt need in the art for devices that can comprise a sensor, control, and actuator all in one, without the need for a human or external control system in the loop.

SUMMARY

In contrast with the electronically-integrated sensors, actuators, and microprocessors of traditional mechatronic systems, natural systems embody these sensing, actuation, and control functions within their compositional and structural features. Inspired by nature, one can embody logic in autonomous systems to enable them to respond to multiple stimuli. Using 3D printable fibrous composites, one can fabricate structures with geometries near bifurcation points associated with a transition between bistability and monostability. When suitable stimuli are present, the materials swell anisotropically. This forces a key geometric parameter to pass through a bifurcation, triggering rapid and large-amplitude self-actuation. The actuation time can be programmed by varying structural parameters (from 0.6 to 108 s for millimeter-scale structures). One can demonstrate this bioinspired control strategy with examples that respond to their environment according to their embodied logic, without electronics, external control, or tethering.

In contrast with the electronically-integrated sensors, actuators, and microprocessors in traditional mechatronic systems, natural systems embody these sensing, actuation, and control functions within their compositional and structural features. Inspired by nature, one can embody logic in autonomous systems to enable them to respond to multiple stimuli. Using 3D printable fibrous composites, one can fabricate structures with geometries near bifurcation points associated with a transition between bistability and monostability. When suitable stimuli are present, the materials swell anisotropically. This forces a key geometric parameter to pass through a bifurcation, triggering rapid and large-amplitude self-actuation. The actuation time can be programmed by varying structural parameters (e.g., from 0.6 to 108 s for millimeter-scale structures). This bioinspired control strategy is demonstrated here with examples that respond to their environment according to their embodied logic, without electronics, external control, or tethering.

The present disclosure provides, inter alia, a new class of adaptable materials that rapidly, autonomously, and programmably change morphology and mechanical function in response to defined environmental cues.

Inspired by these mechanisms, provided here is a combination of anisotropic swelling with nonlinear structural design and instabilities to produce rapid, large-amplitude morphological changes in soft structures, actuation events which take place autonomously in response to the environment. The extrusion process enables construction of structures from multiple distinct responsive materials, enabling actuation events to occur programmably in response to multiple cues (for example, a prototype box was made that remains closed until it encounters an oil-water interface, requiring the presence of both hydrophilic and hydrophobic materials to open). Nonlinear design is used to geometrically control the timing of these structural changes, allowing structures to respond to multiple stimuli in a programmed sequence of morphological changes at precise time intervals.

Extrusion processes enable precise control of geometry at length scales on the order of hundreds of microns, similar to conventional 3D printers. At this length scale, the specific choice of geometric parameters determines the nonlinearity of the system (controlling bistability, snap-through, etc.).

A heterogeneous distribution of fiber orientations results in anisotropic swelling when appropriate stimuli are introduced, controllably distorting the geometric parameters on which the nonlinear behaviors depend. This produces rapid morphological changes if nonlinear bifurcation points are traversed.

By combining multiple materials (that respond to distinct cues) with control over the timing of actuation, one can produce complex embodied logic that is based solely on the material-structure combination rather than traditional sensors or actuators.

In connection with the foregoing, the present disclosure provides, inter alia, (1) active materials that swell (or contract or otherwise deform) anisotropically in response to defined orthogonal cues, and that can be patterned with high fidelity via direct ink writing; (2) a modeling framework to couple anisotropic material swelling with geometric design parameters; and (3) autonomous systems with embodied logic that actuate in response to multiple environmental cues with a defined sequence of actuation events This combination of nonlinear mechanics with active materials provides a new bioinspired approach that enables new functionality in soft autonomous systems.

In one aspect, the present disclosure provides environmentally sensitive structures, comprising: a bistable element comprising an anisotropic material sensitive to an environmental stimulus, at least one portion of the bistable element being in mechanical communication with a support element, the bistable element being structured such that exposure of the anisotropic material to the environmental stimulus effects conversion of the bistable element a to a monostable element, and the bistable element having a characteristic dimension that is changeable with exposure of the anisotropic material to the environmental stimulus.

In another aspect, the present disclosure provides methods, comprising exposing an environmentally sensitive structure according to the present disclosure to the environmental stimulus so as to effect in the bistable element a conversion to a monostable element.

Also provided are devices, comprising a plurality of environmentally sensitive structures according to the present disclosure.

Further provided are methods of fabricating an environmentally sensitive structure, comprising: placing a portion of a bistable element that comprises an anisotropic material into mechanical communication with a support element, the anisotropic material of the bistable element being sensitive to an environmental stimulus, and the bistable element being constructed such that exposure to the environmental stimulus effects conversion of the bistable element to a monostable element, the placing being effected so as to give rise to an environmentally sensitive structure.

Also provided are environmentally sensitive structures, comprising: (i) a first bistable element comprising an anisotropic material sensitive to a first environmental stimulus, the first bistable element being structured such that exposure of the anisotropic material to the first environmental stimulus effects conversion of the first bistable element to a first monostable element, and the first bistable element having a characteristic dimension that is changeable with exposure of the anisotropic material to the first environmental stimulus; (ii) a second bistable element comprising an anisotropic material sensitive to a second environmental stimulus, the second bistable element being structured such that exposure of the anisotropic material to the first environmental stimulus effects conversion of the second bistable element to a second monostable element, and the second bistable element having a characteristic dimension that is changeable with exposure of the anisotropic material to the second environmental stimulus.

Further disclosed are methods, comprising: with a system comprising (a) a first bistable element comprising an anisotropic material sensitive to a first environmental stimulus to the first environmental stimulus such that exposure to the first environmental stimulus effects conversion of the first bistable element to a first monostable element and (b) a second bistable element comprising an anisotropic material sensitive to a second environmental stimulus such that exposure to the second environmental stimulus effects conversion of the second bistable element to a second monostable element, exposing the system to a stimulus such that the stimulus (i) effects conversion of the first bistable element to a first monostable element and (ii) effects conversion of the first bistable element to second monostable element, the conversion of the first bistable element and the conversion of the second bistable element cooperating to effect an output of the system.

Additionally provided are methods, comprising: with a system comprising (a) a first bistable element comprising an anisotropic material sensitive to a first environmental stimulus to the first environmental stimulus such that exposure to the first environmental stimulus effects conversion of the first bistable element to a first monostable element and (b) a second bistable element comprising an anisotropic material sensitive to a second environmental stimulus such that exposure to the second environmental stimulus effects conversion of the second bistable element to a second monostable element, exposing the system to a stimulus such that an output of the system is effected by either the conversion of the first bistable element to a first monostable element or by the conversion of the second bistable element to a second monostable element.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

(FIG. 5B) provides the unit with larger $w_0/L_0$ actuates first (at time $t_1$*), which unlocks the lobe; (FIG. 5C and FIG. 5D) provide that if a mechanical load is applied while the flytrap is unlocked it closes. (FIG. 5E and FIG. 5F) provide that the second bistable unit actuates (at time $t_2$*) and relocks the lobe; adding a mechanical load at this point has no effect;

(FIG. 7A) shows the box has a PDMS unit inside and a hydrogel valve, which is closed. When exposed to water, the hydrogel swells and buckles to open the valve, allowing solvent to go into the box. In this panel, no stimuli are present. (FIG. 7B) When there is only water, the valve opens and the water reaches the inner unit, but it cannot actuate the unit. (FIG. 7C) When only toluene is applied, the hydrogel valve remains closed and the toluene cannot reach the inner unit. (FIG. 7D) When water and toluene are both applied, the valve opens, toluene and water go into the box, and the toluene is absorbed into the unit, causing actuation to occur; and FIGS. 8A-8C provides (FIG. 8A) a device that for Open ($S_1/\backslash S_2$), both hydrogel (green) and PDMS (blue) must be triggered for the box to open. (FIG. 8B) by inverting the hydrogel beams (green), the presence of $S_2$ (water, or even too much humidity) causes the beams to snap downward, inserting a pin through the lid and into the box, locking it (Ex. 3 in Table 1). (FIG. 8C) $S_1$ and $S_2$ must both be encountered to open the box, but now with a condition requiring $S_1$ and $S_2$ to occur within 5 s of one another; θ and t/L for beam pairs 1 & 3 are closer to the phase boundary than for beam pairs 2 & 4; S1 (non-polar solvent) causes beam pair 1 to rapidly deploy, partly unlocking the box; but 5 s later, beam pair 2 inserts a rod to lock the box, preventing it from opening unless S2 occurs during that 5 s interval (similarly, S2 causes beam pair 3 to rapidly unlock, but causes beam pair 4 to lock the box 5 s later).

DETAILED DESCRIPTION OF ILLUSTRATIVE EMBODIMENTS

The present disclosure can be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order. Any documents cited herein are incorporated by reference in their entireties for any and all purposes.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range. In addition, the term "comprising" should be understood as having its standard, open-ended meaning, but also as encompassing "consisting" as well. For example, a device that comprises Part A and Part B may include parts in addition to Part A and Part B, but may also be formed only from Part A and Part B.

The general design approach being introduced here is widely applicable to active, responsive, deployable, shape-changing, or environmentally-adaptable structures.

Provided here are responsive structures that rapidly and autonomously change shape and function in response to multiple defined cues. Achieving this applies principles from nature and nonlinear mechanics, as well as new, extrudable, stimuli-responsive materials and associated hardware.

General Concepts

Figure 1A:
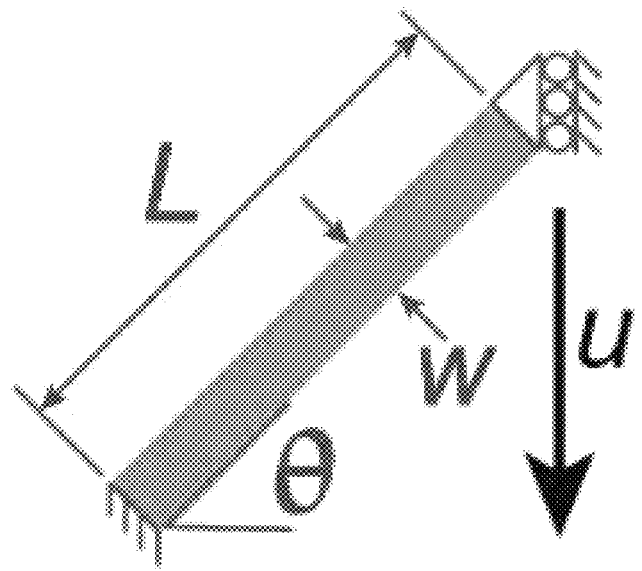
FIG. 1A provides a schematic and photo of beams, with key geometric parameters and boundary conditions.
Figure 1A:
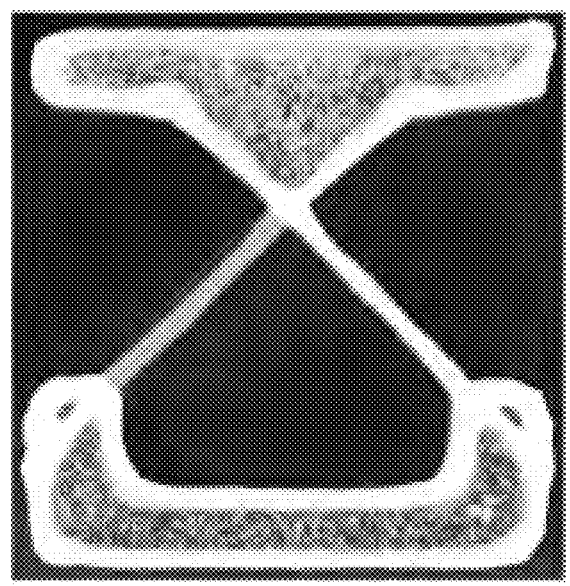

The laterally-constrained beams, depending on their geometric parameters and boundary conditions, can exhibit very different mechanical responses, including cantilever-like bending, snap-through instabilities[53], and bistability[51,52,59]. Each of these behaviors corresponds to specific domains in a parameter space defined by beam geometry. For laterally-confined, tilted beams, these key geometric parameters are the inclination angle of the beam ($\Theta$) and its slenderness ratio (w/L, where w denotes the beam width and L denotes the beam length) (FIG. 1A). Finite element simulations were used (discussed in detail later) to obtain the bistable and monostable energy curves in FIG. 1B (curves I and III, respectively), both with $\Theta=45°$ but with different w/L ratios (corresponding to points I and III in FIG. 1C). A bistable mechanical response is defined by a dual-well potential (FIG. 1B), with each well representing a stable morphology that can be maintained without any applied force or continued input of energy.

The two stable configurations are separated by an energy barrier that, if traversed, produces an instability and a rapid snap-through from one stable configuration to the other. The two stable wells are not at the same energy level because in one configuration the beam is unstrained, and in the other it is buckled (associated with strain energy). The size of the energy barrier, i.e., the depth of the second well ($E_{out}$ in FIG. 1B), can be controlled by the geometry of the beams. For a fixed $\Theta$, as w/L increases (i.e., as the beam becomes wider relative to its length) the energy barrier decreases, reaching a value of zero at a specific value of w/L which defines a bifurcation point, B. For values of w/L larger than B, the beam is monostable, meaning it will return to its undeformed position (u=0) if the applied force is removed. The critical value of w/L=B changes as a function of $\Theta$, as represented by the orange line dividing bistable from monostable regions in FIG. 1C.

Because of this sharp critical value, only a small nudge to the geometric parameters (e.g., via active materials) is necessary to cross a bifurcation point and trigger rapid snap-through for the purpose of actuation or movement. To accomplish this, beams were fabricated using highly-anisotropic composite materials, causing anisotropic swelling of the beams upon exposure to material-specific cues (e.g., water or non-polar solvents).

Figure 1B:
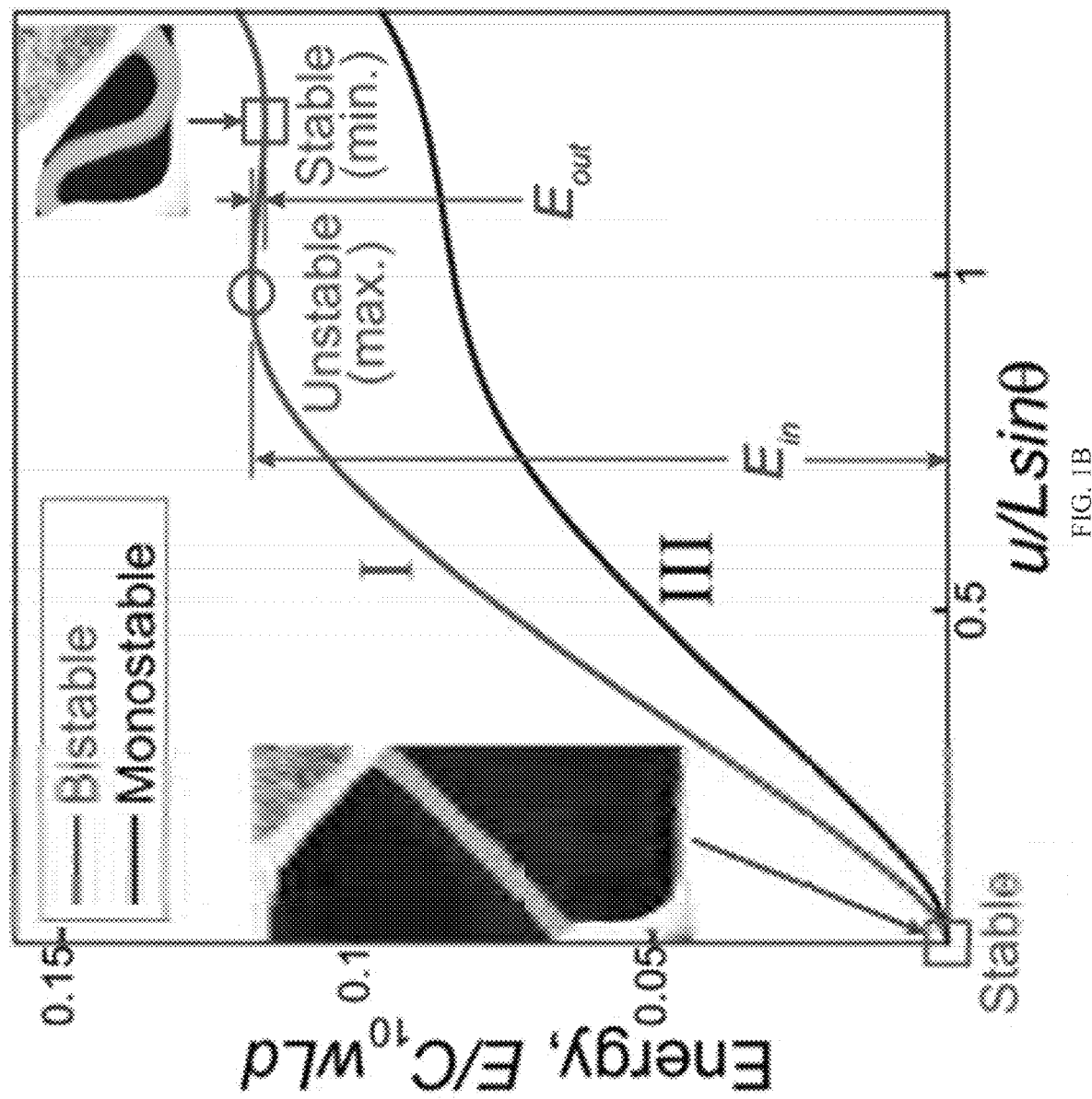
FIG. 1B provides the normalized strain energy, $E/(C_{10}wLd)$, where $C_{10}$ is a material parameter in the Holzapfel-Gasser-Ogden (HGO) model and d is the out-of-plane thickness of the beam; plots are included for a bistable beam (red curve, I) and a monostable beam (black curve, III) as a function of normalized displacement, $u/L \sin \Theta$, obtained via finite element simulations. The inset provides photos of the undeformed (u=0) and buckled configurations, corresponding to the two stable points (energy minima) on the bistable curve; the monostable curve has only the single minimum at u=0.
Figure 1C:
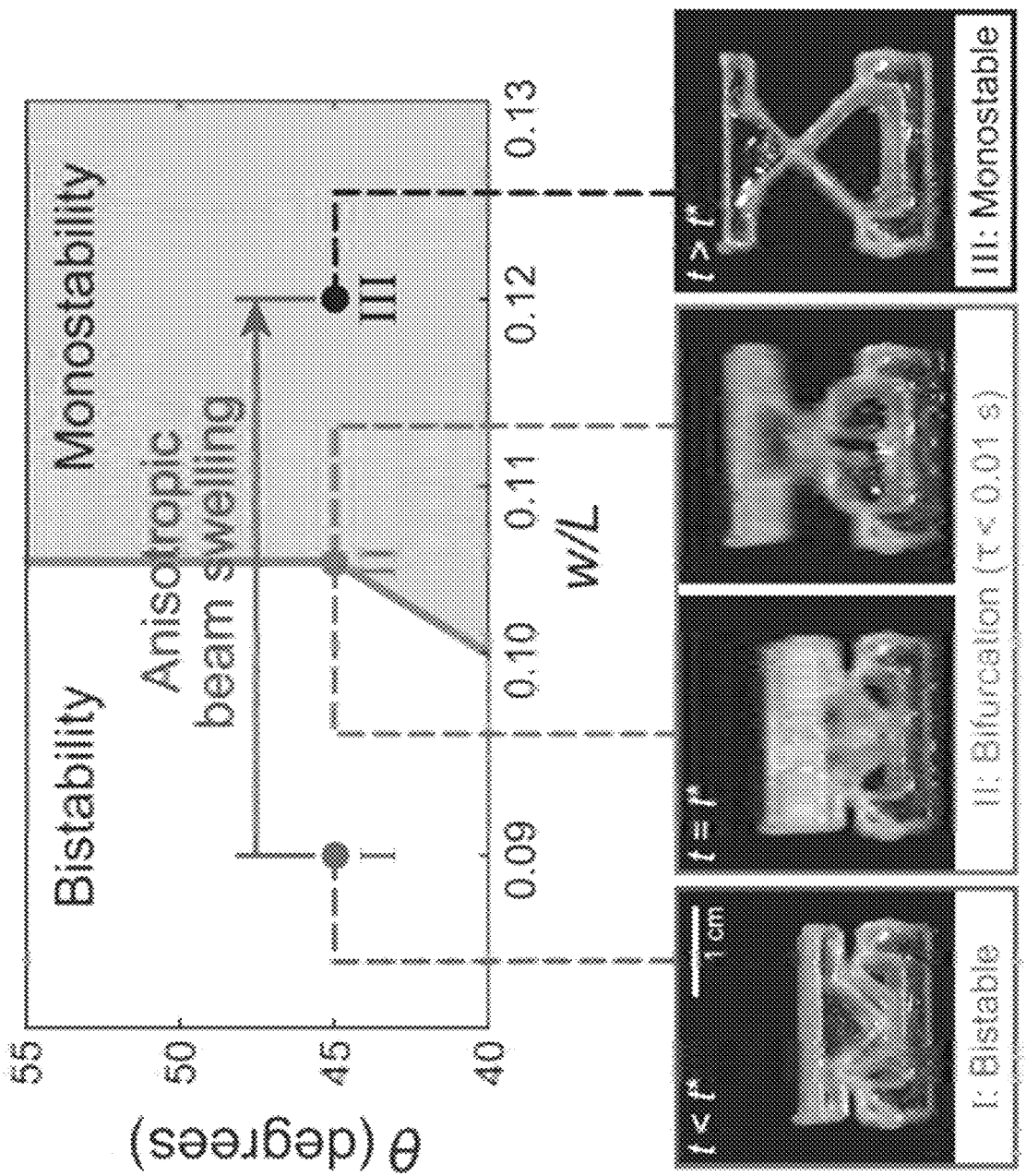
FIG. 1C provides a geometric phase diagram mapping geometric parameters to mechanical behavior, with schematic overlay indicating the transition from bistable to monostable (point I to point III) due to anisotropic swelling of the beams. Also shown are representative images recorded with a high-speed camera during actuation showing a unit when it is bistable (red, I), at the point of bifurcation when actuation occurs (green, II), and monostable (black, III)

As shown in FIGS. 1B-1C, for a beam fabricated with geometry corresponding to point I (w/L<B) and placed in its buckled configuration, if it were to anisotropically swell to point III (w/L>B) it would have to pass through the bifurcation point at point II (w/L=B=0.105), above which the beam is only stable in its unbuckled configuration (u=0). This forces a rapid actuation event, rapidly releasing the strain energy from the beam as it ceases to be bistable. The images in FIG. 1C demonstrate the rapid actuation ($\tau<0.01$ s) that occurs for any beam that traverses such a bifurcation point. $\tau$ represents the amount of time it takes for the actuation event (the release of the stored strain energy) once bifurcation is reached (as observed with a high speed camera). Without being bound to any particular theory, the value of w/L can remain unchanged during swelling of an isotropic beam, and thus would not reach the bifurcation point horizontally. (Depending on the specific architecture, isotropic swelling could still lead to the crossing of a bifurcation point via an increase in $\Theta$. However, because the monostable/bistable boundary is nearly vertical, it would typically require a larger degree of material swelling to do so.) By harnessing systems of 3D printable bistable, anisotropic beam units (each of which can be independently assigned its own choice of actuation timing and its own stimulus, as described later), the disclosed bioinspired approach allows the "embodiment" of complex control in this material-structure combination.

Figure 1D:
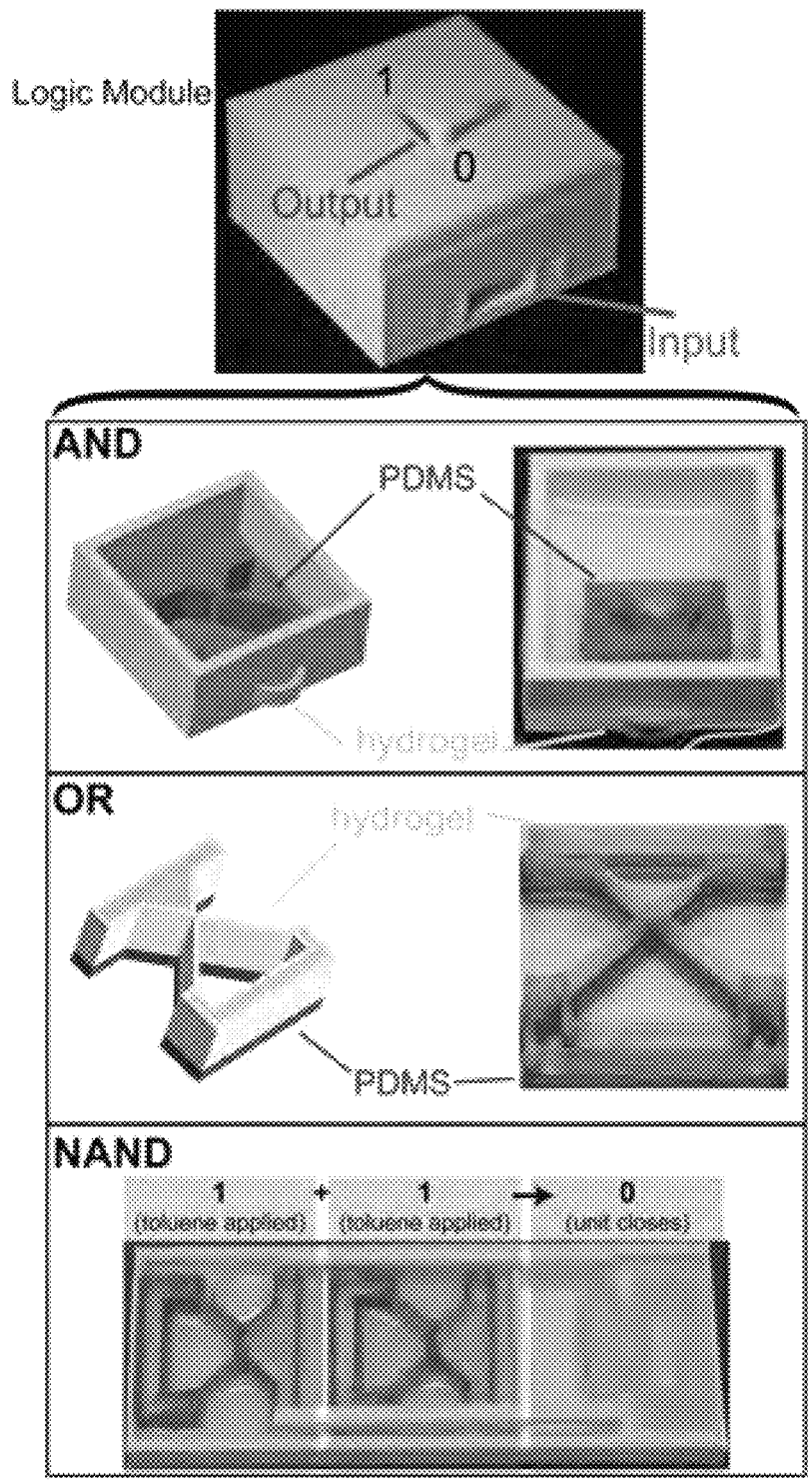
FIG. 1D provides an exemplary logic module that can act as one of several types of logic gates, depending on the contents of the module. An AND gate can be constructed by using a hydrogel valve and a PDMS-GF1 bistable unit (requiring both water and toluene to switch from 0 to 1). An OR gate can be constructed by fabricating a composite bistable unit from both PDMS-GF5 (blue) and hydrogel (transparent) materials (this actuates if either water or toluene is applied); A functionally-complete NAND gate can be constructed by connecting two "input" bistable units to one "output" unit. In this case, only when toluene is applied to both input units will the output unit close from 1 to 0 (i.e., 1+1→0).

FIG. 1D demonstrates a modular embodied logic, in which a mechanical logic module can produce AND, OR, or NAND output in response to chemical inputs, depending on which structures are placed inside the module. One can produce an AND gate by using a hydrogel valve and a PDMS-GF15 bistable unit inside.

The actuation of this inner bistable unit flips the output of the module from 0 to 1. However, to achieve this, water must be present (to make the hydrogel swell and buckle, opening the valve) as well as toluene (to trigger the actuation of the unit). One can produce an OR gate by constructing a bistable unit with out-of-plane arrangements of both PDMS-GF5 (blue) and hydrogel (transparent) materials. This bistable unit can actuate when either water or toluene is applied. Finally, one can produce a NAND gate by connecting two units (corresponding to two inputs) and one output. The stiffness of these is tuned (via geometry) such that both inputs must actuate in order to close the output unit (i.e. $1+1\rightarrow0$). Otherwise, the output unit remains open. Because NAND is a functionally-complete logic gate, in principle any gated logic could be achieved via combinations of these.

To chain the logic gates into more complex systems, the mechanical response from one gate (the output) can be used either to indicate when to perform a manual pour, or to automatically open a chamber to allow fluid movement to the next gate (e.g., the input solvents for the NAND gate could be either manually poured or introduced automatically via suitable channel design).

Materials and Fabrication

In an exemplary system, first each material must swell in response to a defined stimulus, e.g., water, non-polar solvents, temperature, radiation (e.g., light), and others. This disclosure is illustrated using the first two of these stimuli, but any stimulus can work. Second, the materials can swell anisotropically to alter the key geometric parameter (w/L) when exposed to their stimuli, allowing a well-controlled approach to move through a bifurcation. Third, the materials can be sufficiently elastic to maintain a buckled configuration (e.g., a maximum material strain of $\varepsilon_{max}<0.15$) without prohibitive time-dependent relaxation, as it is this stored elastic energy which enables the actuation event. Finally, the materials (or material precursors) must be patternable with high structural fidelity, since the mechanical response of the beams is determined by precise values of geometric parameters.

Figure 2A:
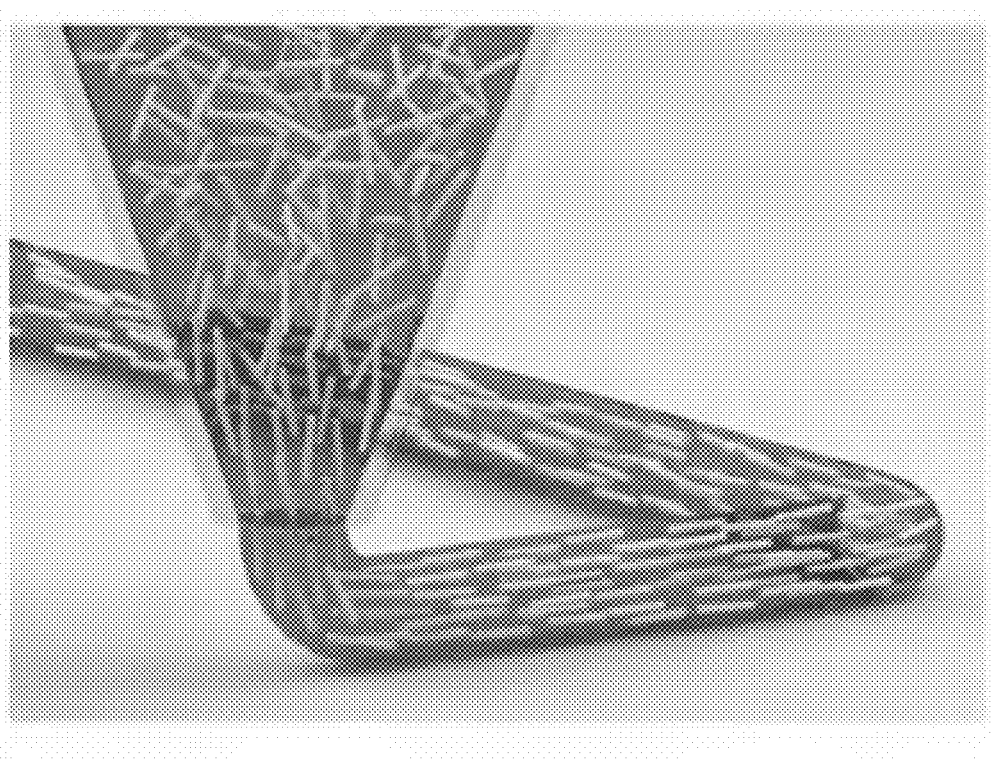
FIG. 2A provides a schematic of extrusion of PDMS ink during DIW (direct-ink-writing of PDMS glass-fiber composites) 3D printing, leading to alignment of glass fibers.
Figure 2B:
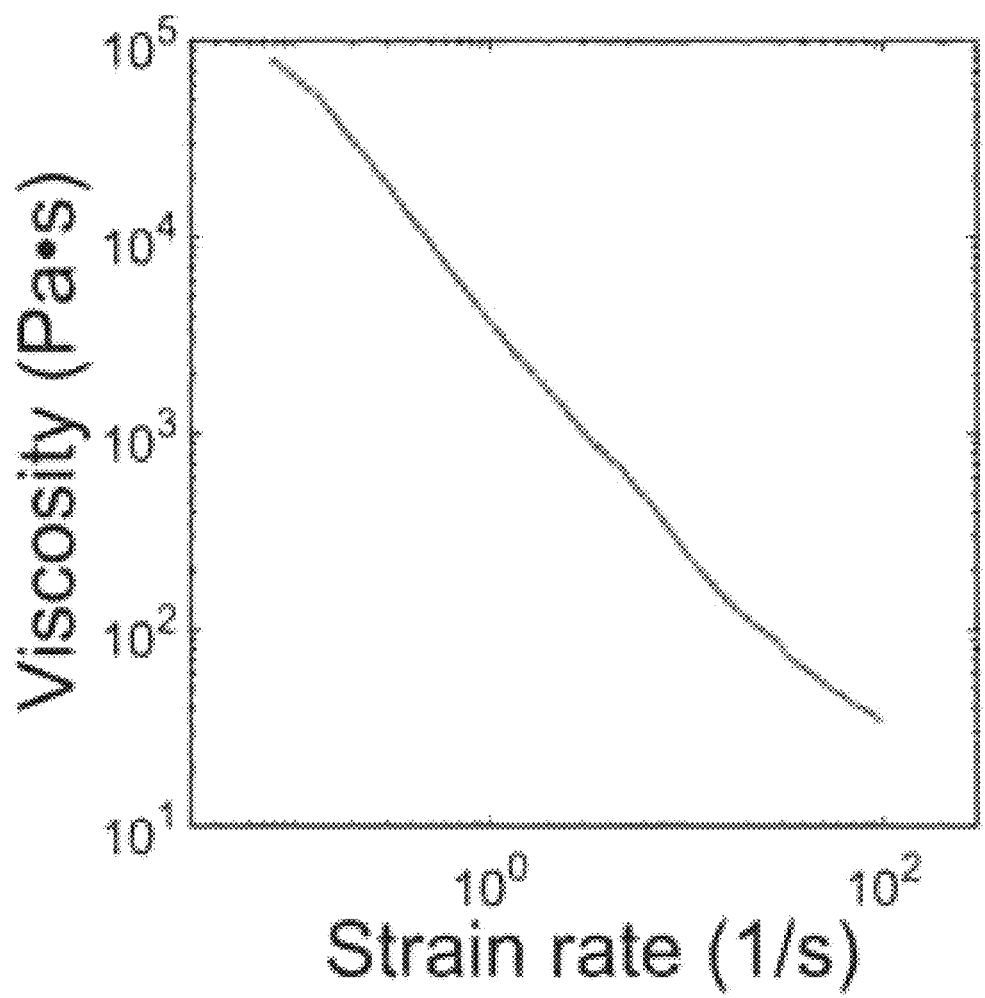
FIG. 2B and FIG. 2C provide a rheological characterization of the PDMS-GF ink showing shear-thinning and yield-stress behavior, respectively (in FIG. 2C, G' is the upper line, and G" is the lower line)
Figure 2C:
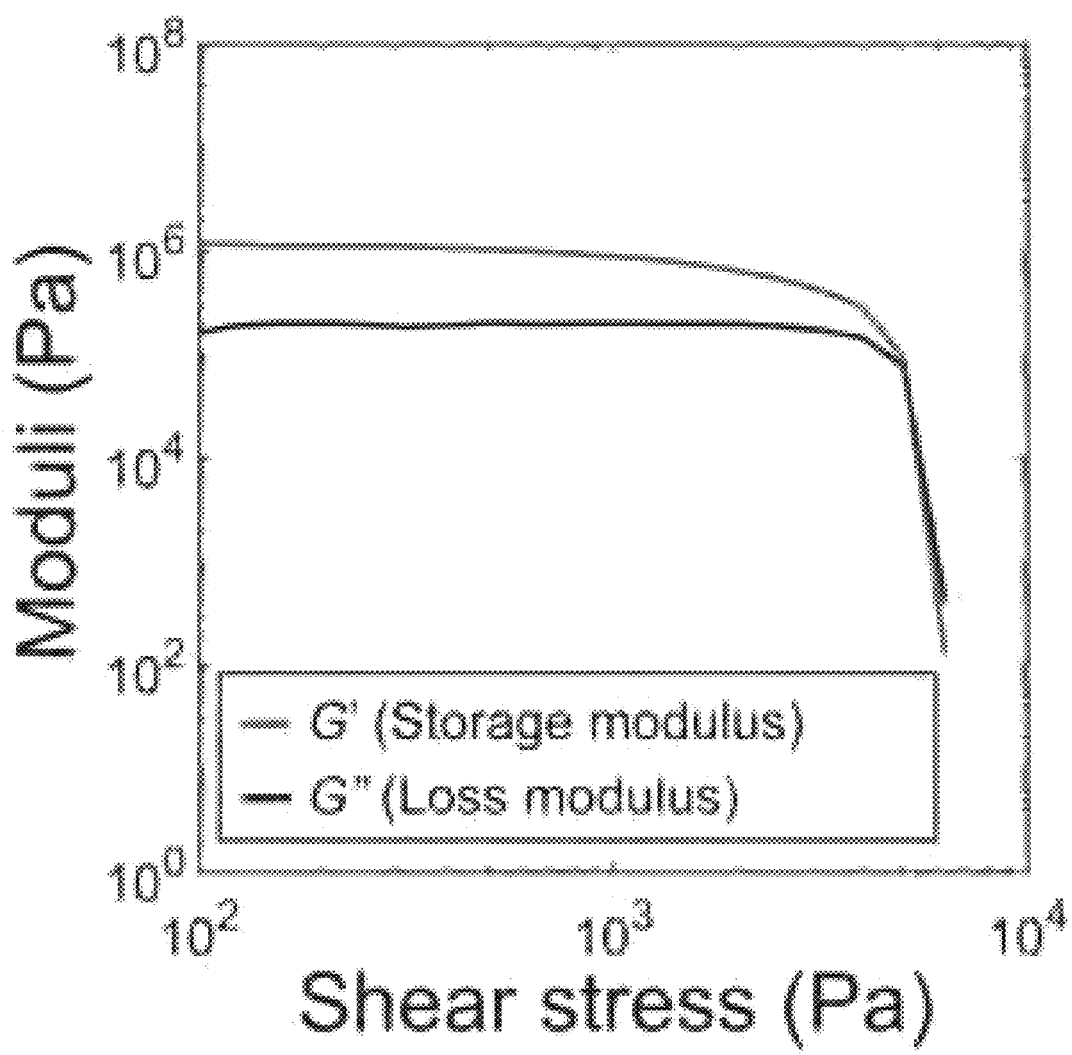
Figure 2D:
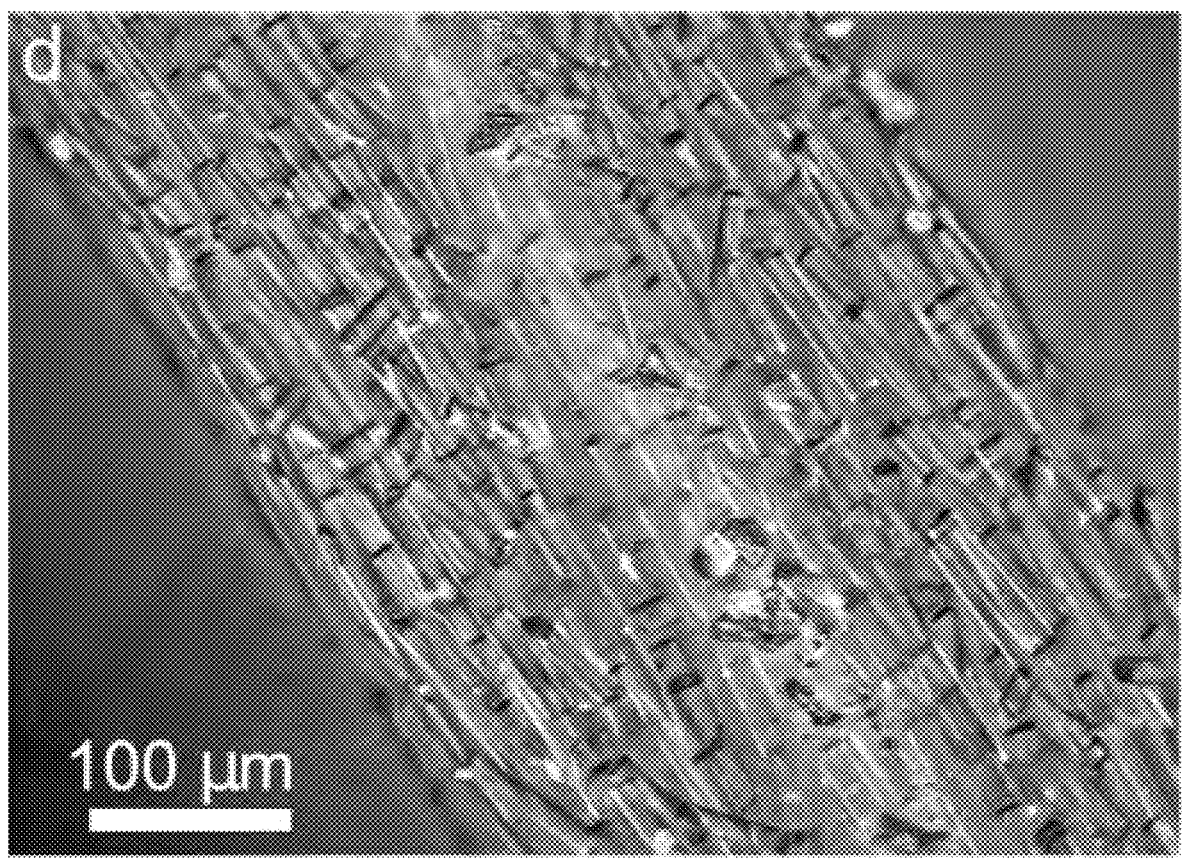
FIG. 2D provides an optical micrograph showing material printed using PDMS-GF ink (15 vol % glass fibers), with alignment of glass fibers along the print direction.

While 3D printers make it relatively easy to achieve sufficient structural fidelity of the beams, some 3D printers can not simultaneously achieve the other requirements. Direct ink writing (DIW) is an extrusion-based 3D printing technique that offers a large degree of materials flexibility, and is ideal for producing anisotropic materials (fibers align due to material shear in the nozzle (FIG. 2A)). This approach allows us to meet all four criteria above, but requires some rheological tuning of the materials to allow printing (FIGS. 2B-2D).

As an illustration, an exemplary embodiment makes use of two materials that respond to two distinct stimuli: a PDMS-based material (containing short glass fibers to provide anisotropy), which swells in the presence of non-polar solvents such as toluene or hexane; and a hydrogel-based matrix (containing cellulose fibrils to provide anisotropy), which swells in the presence of water. The PDMS ink formulation (see Methods) exhibits the rheological properties desired for DIW, including a decrease in apparent viscosity with increasing shear rate (FIG. 2B) and a viscoelastic yielding behavior that is characterized by a high storage modulus (G') when the shear stress is low (allowing the material to maintain its shape and to behave like an elastic solid) and a defined yield stress above which the storage modulus suddenly drops (allowing flowability through the nozzle) (FIG. 2C). A similar rheological profile is observed for the hydrogel material.

Figure 2E:
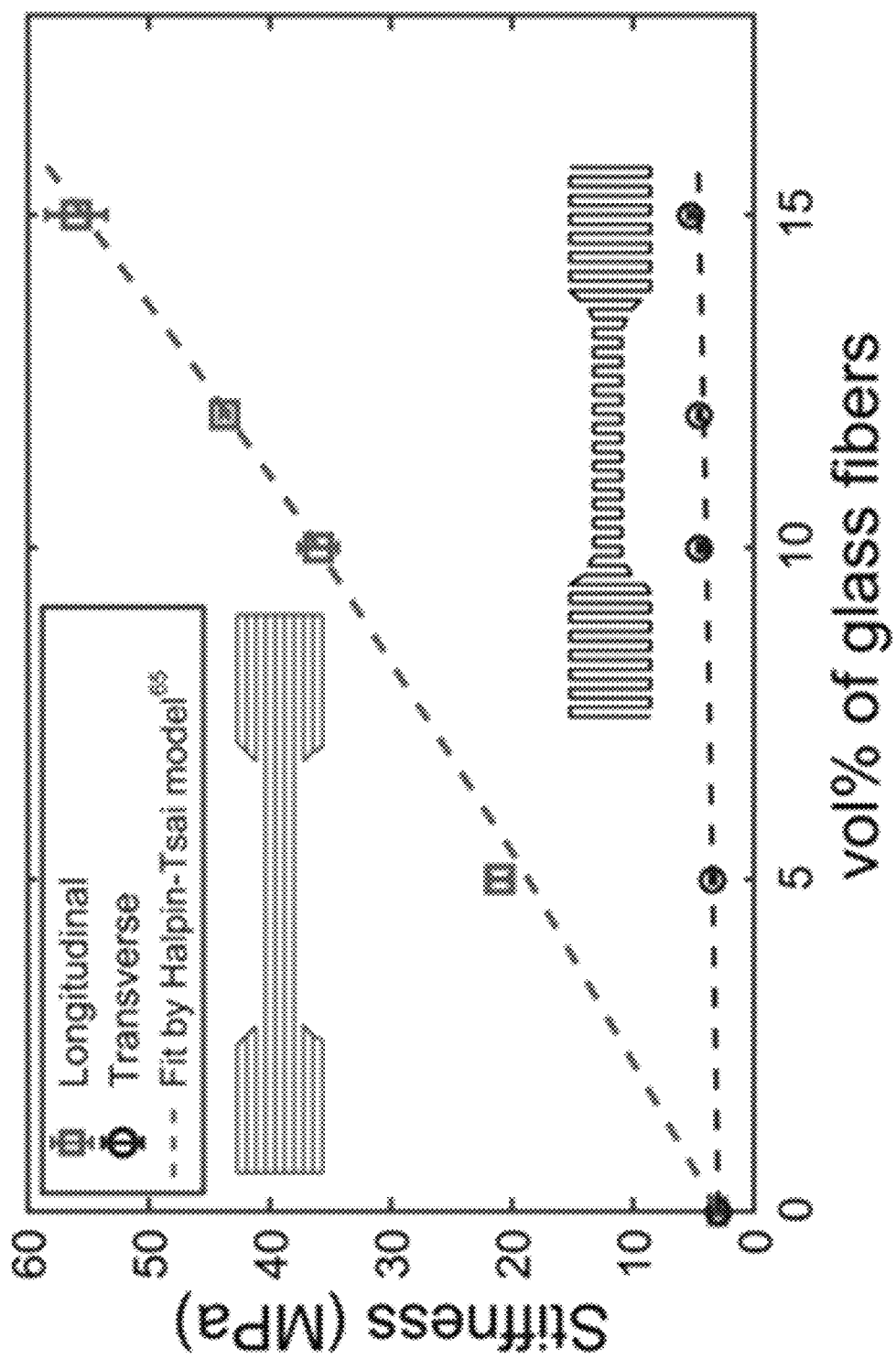
FIG. 2E provides the stiffness of PDMS-GF composites (after curing of printed structures) as a function of the volume fraction of glass fibers and the fiber orientation, based on tensile testing of printed specimens ("Longitudinal" and "Transverse" indicate printing and fiber orientation that is parallel with or perpendicular to the loading direction, respectively), and fit using the Halpin-Tsai model.

Because of the alignment of the fibers during extrusion (FIG. 2D) a high degree of mechanical anisotropy can be achieved. One can characterize this by printing tensile specimens with fiber alignment both parallel with ("Longitudinal") and perpendicular to ("Transverse") the loading direction, subsequently testing these under quasistatic tension (see Methods) (FIG. 2E). Because the glass fibers are much shorter than the beam length, the Halpin-Tsai model is used, with the best fit corresponding to a matrix stiffness of $E_m$=2.96 MPa and a fiber stiffness of $E_f$=52.13 GPa.

With increasing glass fiber volume fraction, the longitudinal stiffness, $E_L$, increases much more than the transverse value, $E_T$ (FIG. 2E), as expected for short fiber composites. With 15 vol % glass fibers, significant mechanical anisotropy ($E_L/E_T$=10.8) was obtained while good printability is maintained.

Mechanical Behavior

In prior work on the bistability of laterally-constrained beams the relationship between beam geometry (the two key geometric parameters Θ and w/L) and the stability behavior (e.g., bistable or monostable) was considered material-independent. However, this conclusion implicitly assumed that the material was isotropic. In fact, the degree of material anisotropy is also essential for determining the stability. Using experiments and finite element analysis (FEA), one can locate the boundary between regions of monostability and bistability in the geometric phase diagram (e.g., FIG. 1C) for the more general case in which the material anisotropy is allowed to vary.

One can first fit an anisotropic hyperelastic mechanical model, the Holzapfel-Gasser-Ogden (HGO) model, to experimental tensile data for the case of 15 vol % glass fibers and then use this to conduct a parametric study (FIG. 4). The results (FIGS. 4A and 4B) indicate that a beam with Θ=45° is bistable if w/L is less than 0.105 (i.e., the second energy well exists, and therefore the quantity $E_{out}$ can be defined and is nonzero), and monostable otherwise. This is consistent with an experimentally-determined phase boundary between 0.102<w/L<0.108. One can provide a more complete phase diagram by systematically varying Θ and w/L and determining the normalized energy barrier $E_{out}$/($C_{10}$wLd) (FIG. 4C), which is very different from the isotropic case. Without being bound to any particular theory, the phase boundary can depend on the degree of anisotropy (see FIG. 4D). For a beam of fixed length, L, the greater the degree of material anisotropy, the thinner the beam must be to be bistable.

The anisotropy in stiffness imparted by the alignment of the glass fibers produces anisotropic swelling when the material is exposed to a suitable solvent (FIGS. 3A-3D). To characterize this, L and w of the printed beams were measured during exposure to the solvent under an optical microscope. Since PDMS swells strongly in non-polar solvents, toluene was used as the stimulus[66]. When allowed to become fully saturated by toluene (at time t=$t_s$), the isotropic PDMS matrix (no glass fibers) swells until each linear dimension has increased by 42%, corresponding to a swelling ratio of η=1.42 (see FIG. 3A).

The mechanical anisotropy produced by aligned fibers (e.g., in PDMS-GF composites) significantly reduces the swelling ratio in the direction of fiber alignment (longitudinal direction), $\eta_L$=$L_s$/$L_0$. The magnitude of this reduction increases as the volume fraction of the fibers (and concomitantly the degree of anisotropy) increases.

Figure 3A:
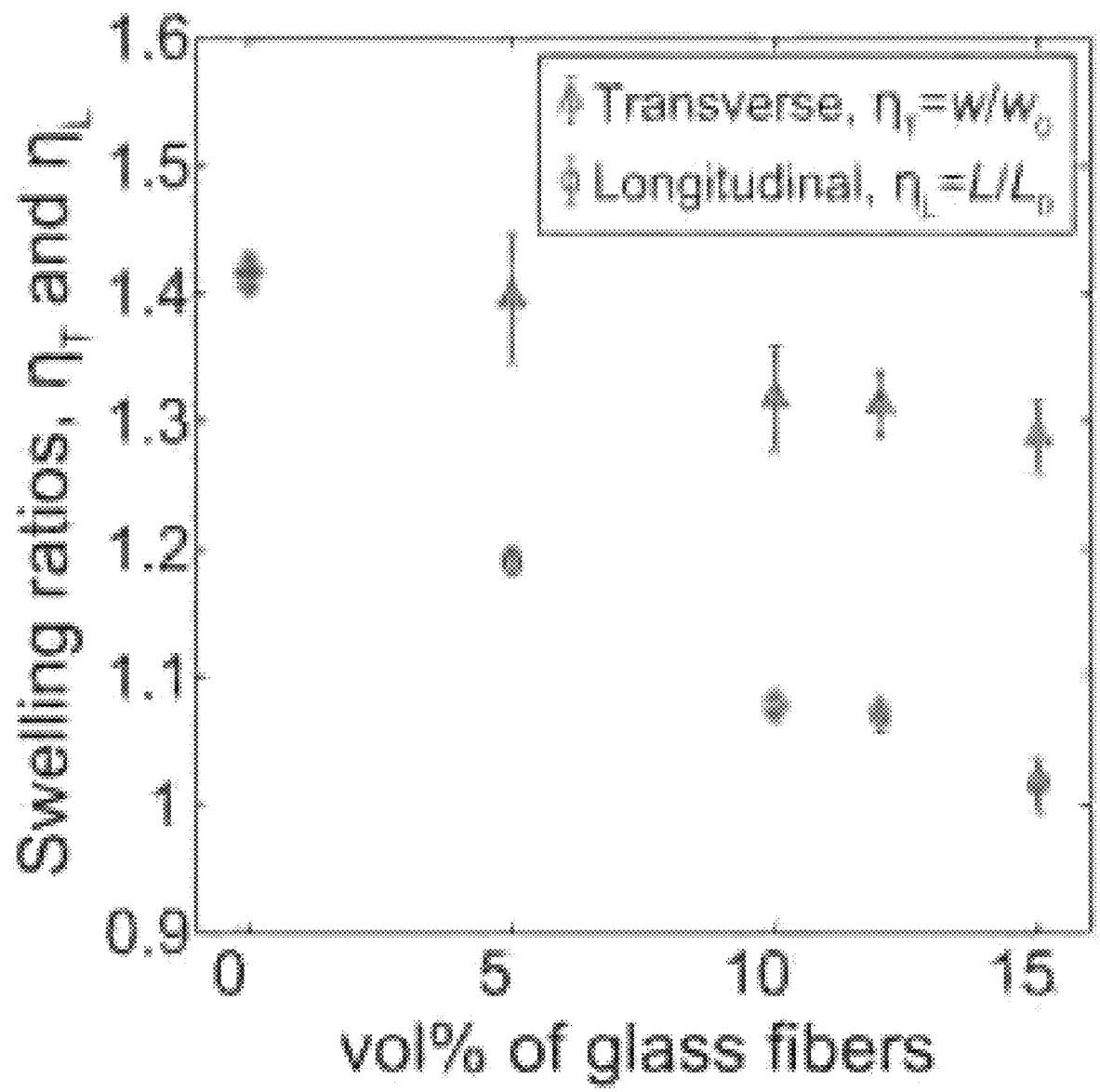
FIG. 3A (control of actuation time) provides the swelling ratio in the transverse ($\eta_r$=w/w$_0$) and longitudinal ($\eta_L$=L/L$_0$) directions for PDMS-GF composite materials after submersion in toluene for one day.
Figure 3B:
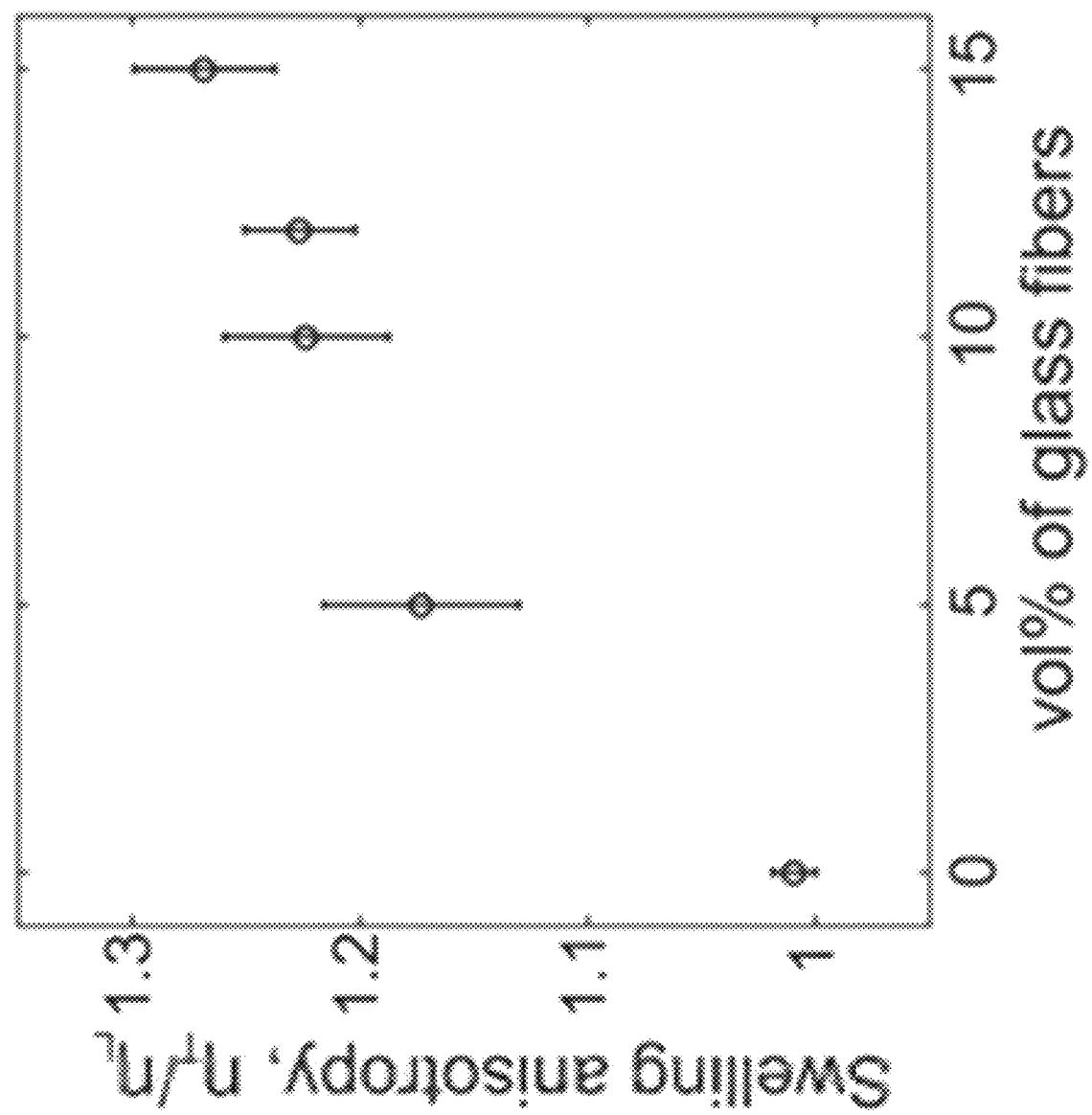
FIG. 3B provides swelling anisotropy, $\eta_r/\eta_L$ as a function of volume fraction of glass fibers.
Figure 3C:
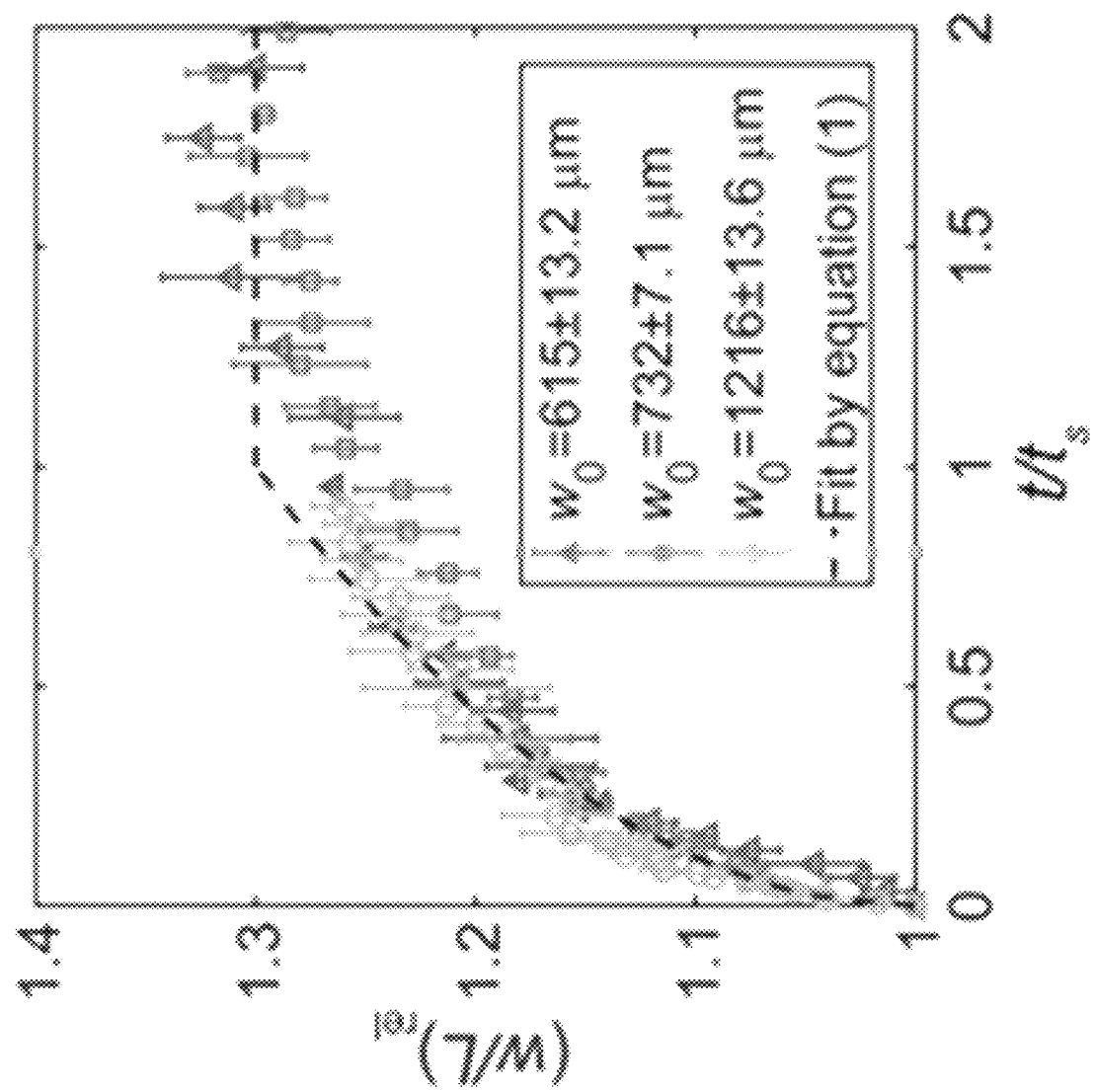
FIG. 3C provides the relative slenderness ratio (w/L)$_{rel}$ as a function of time for beams with different initial widths (time is normalized by saturation time, $t_s$, to account for the dependence of diffusion time on volume of material)

In contrast, there is only a slight reduction in the swelling ratio in the direction perpendicular to the fibers (the transverse swelling ratio, $\eta_T$=$w_s$/$w_0$) relative to the isotropic case (see FIG. 3A), since the fibers do not provide significant reinforcement perpendicular to their alignment. The swelling anisotropy (defined as $\eta_T/\eta_L$) therefore increases with increasing fiber volume fraction (FIG. 3B). Accordingly, w will increase more than L upon exposure to a solvent, and the key geometric parameter w/L that defines the nonlinear behavior of the beam can be altered merely by exposing it to a suitable solvent.

The swelling anisotropy ($\eta_T/\eta_L$) also determines the range in parameter space, Δw/L, through which the geometry of a beam is able to move based on such swelling. The choice of the initial beam geometry $w_0/L_0$ at fabrication determines whether this range is sufficient to bring the beam's geometry through the bifurcation (i.e., the $k_1$=10 phase boundary in FIG. 4D for a 15 vol % PDMS-GF material), as necessary to trigger an actuation event (FIG. 1C). In one experiment (not shown), a bistable unit actuates and jumps dramatically due to the rapid release of strain energy from the buckled beams.

In another such experiment, a bistable unit was integrated with the lid of a 3D printed box, and the strain energy is harnessed to open the lid when an appropriate solvent is encountered. In this case, the box remains closed when placed in water, but when the water becomes contaminated by the addition of toluene, the beams actuate and open the box lid. Using this approach, for example, a box can float indefinitely in the ocean and wait to autonomously open to release a chemical or to obtain a sample when a particular pollutant is encountered, without using batteries or sensors.

Controlling the Time of Actuation

The distance between $w_0/L_0$ and the bifurcation B will set a time interval between the introduction of the stimulus (t=0) and the time at which the beam actuates (t=t*). To quantify this time, measurements were taken of the changing value of w/L during solvent swelling (FIG. 3C) for the PDMS-GF15 ink during submersion in toluene. One can normalize the beam's changing w/L ratio by the initial ratio $w_0/L_0$ to provide a relative value, $(w/L)_{rel}$=(w/L)/($w_0/L_0$), which, assuming simple diffusion, can be derived as $$(w/L)_{rel} = \begin{cases} 1 + \sqrt{(t/t_s)}\,(\eta_T - 1), & t < t_s \\ \eta_T, & t \geq t_s \end{cases} \quad (1)$$

where the time $t_s$=$w_0^2$/8D is the time one can expect the beam to be saturated (based on diffusion), and D is the diffusion coefficient of toluene in PDMS. Using equation (1), the time at which one can expect the beam geometry w/L to reach the bifurcation point B (and hence to actuate) is $$\hat{t}^* = \frac{(BL_0 - w_0)^2}{BD(\eta_T - 1)^2} \quad (2)$$

Figure 3D:
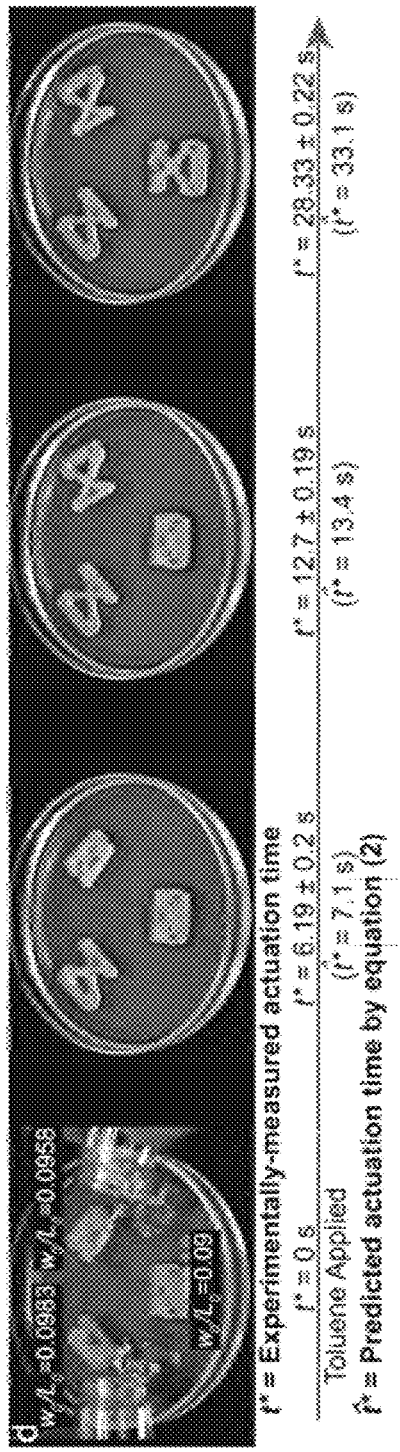
FIG. 3D provides that actuation time can be controlled by selecting specific values for the initial beam geometry, $w_0/L_0$. The measured time t* is given, as well as the predicted time, $\hat{t}$*, as calculated from equation (2). The error bars are the standard deviations computed from multiple measurements.
Figure 4A:
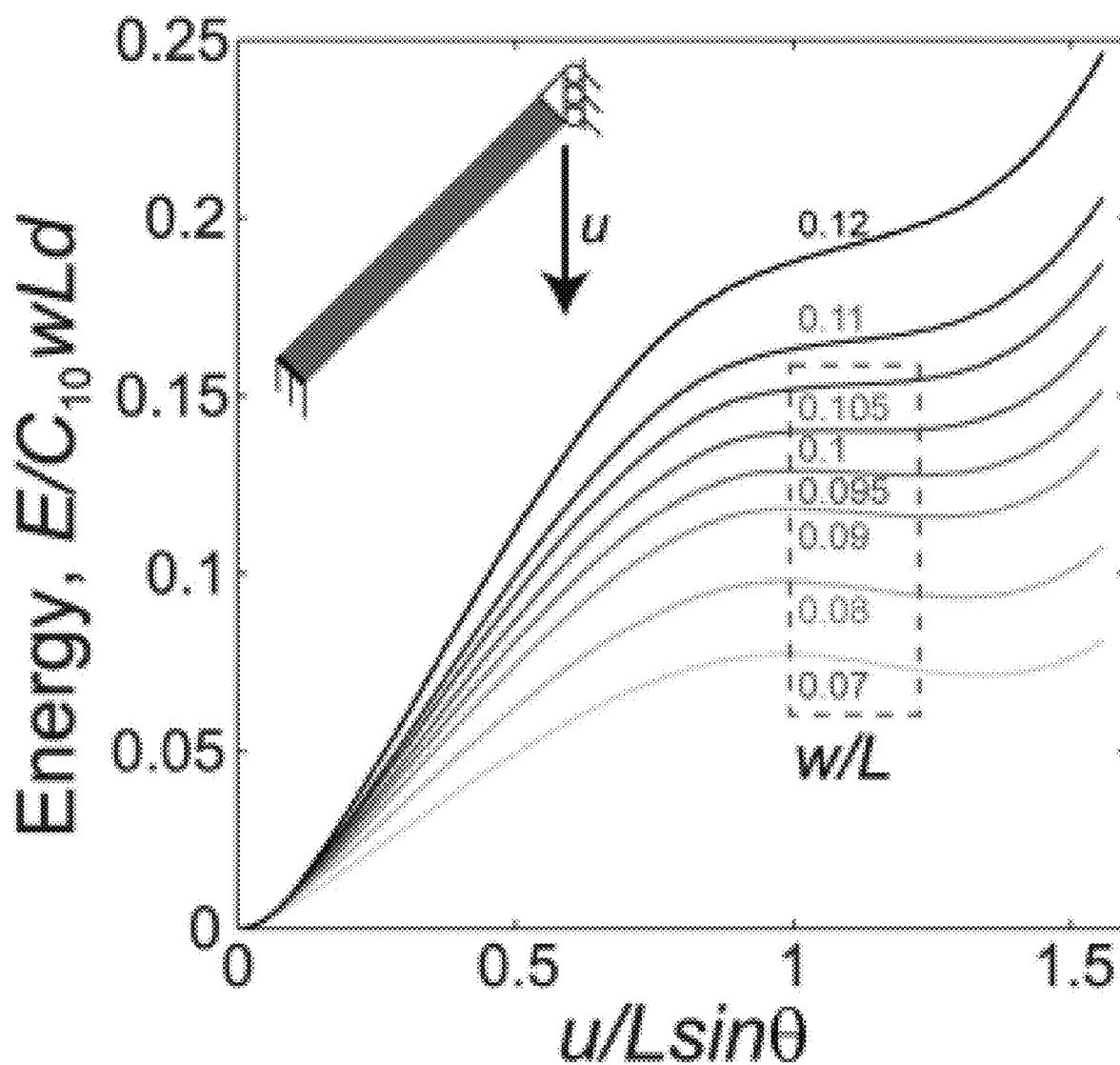
FIG. 4A (energy) and FIG. 4B (force) provide finite element analyses to determine phase boundaries of a 45° beam with w/L ratio varying from 0.07 to 0.12 as a function of displacement, respectively. The w/L values in dashed box indicate bistability of the beam (the data lines in FIG. 4B at u/L sin Q of appx. 0.4 are in the same order as the data lines in FIG. 4A)
Figure 4B:
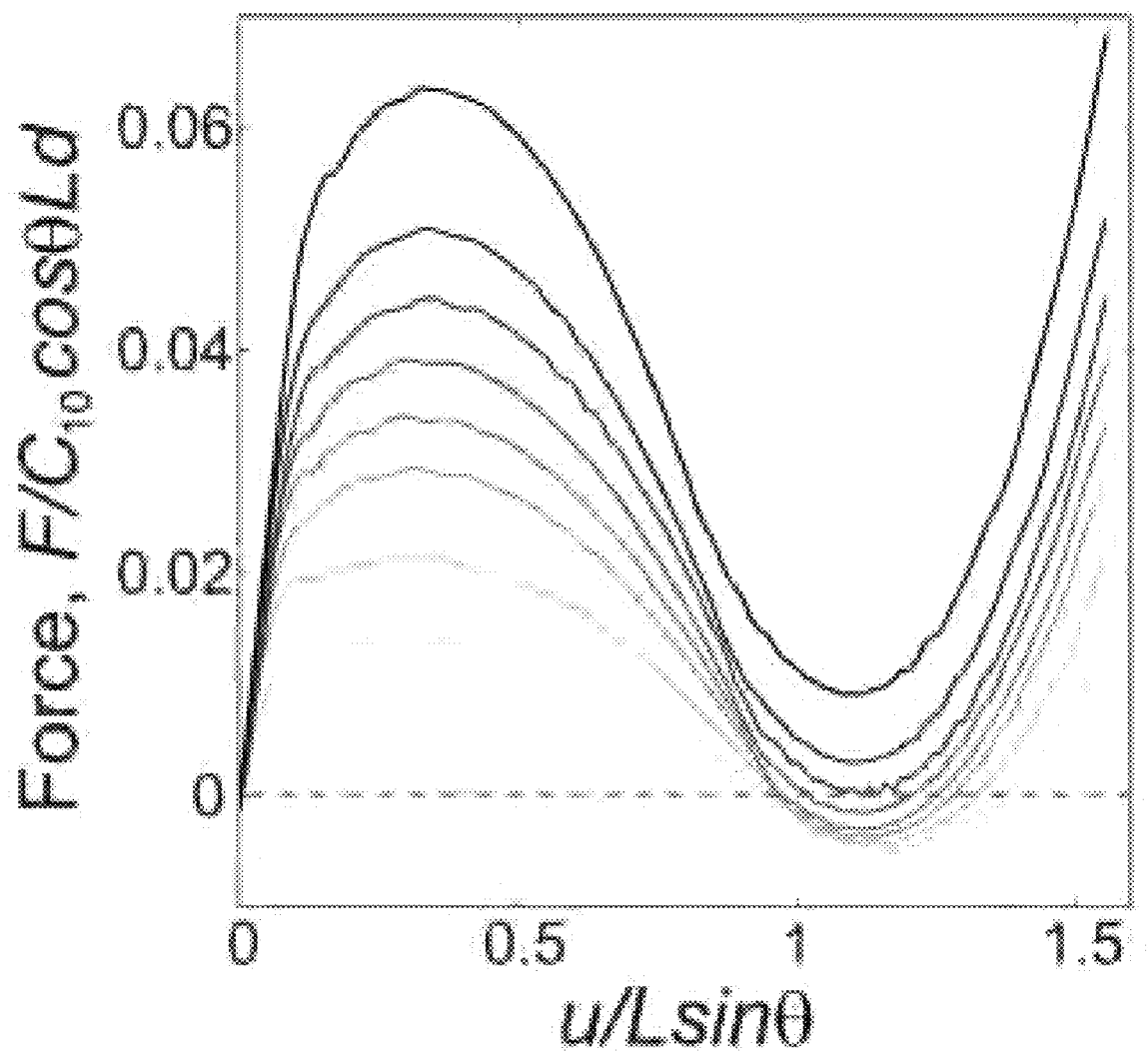
FIG. 4C shows the energy barrier for the beam to snap back to its undeformed configuration—the white region at the right edge of FIG. 4C indicates monostability of the beam.
FIG. 4D shows the phase boundaries for materials with different anisotropy, where $k_1$ is a parameter in HGO model and $k_1$=0 indicates an isotropic case.
Figure 4C:
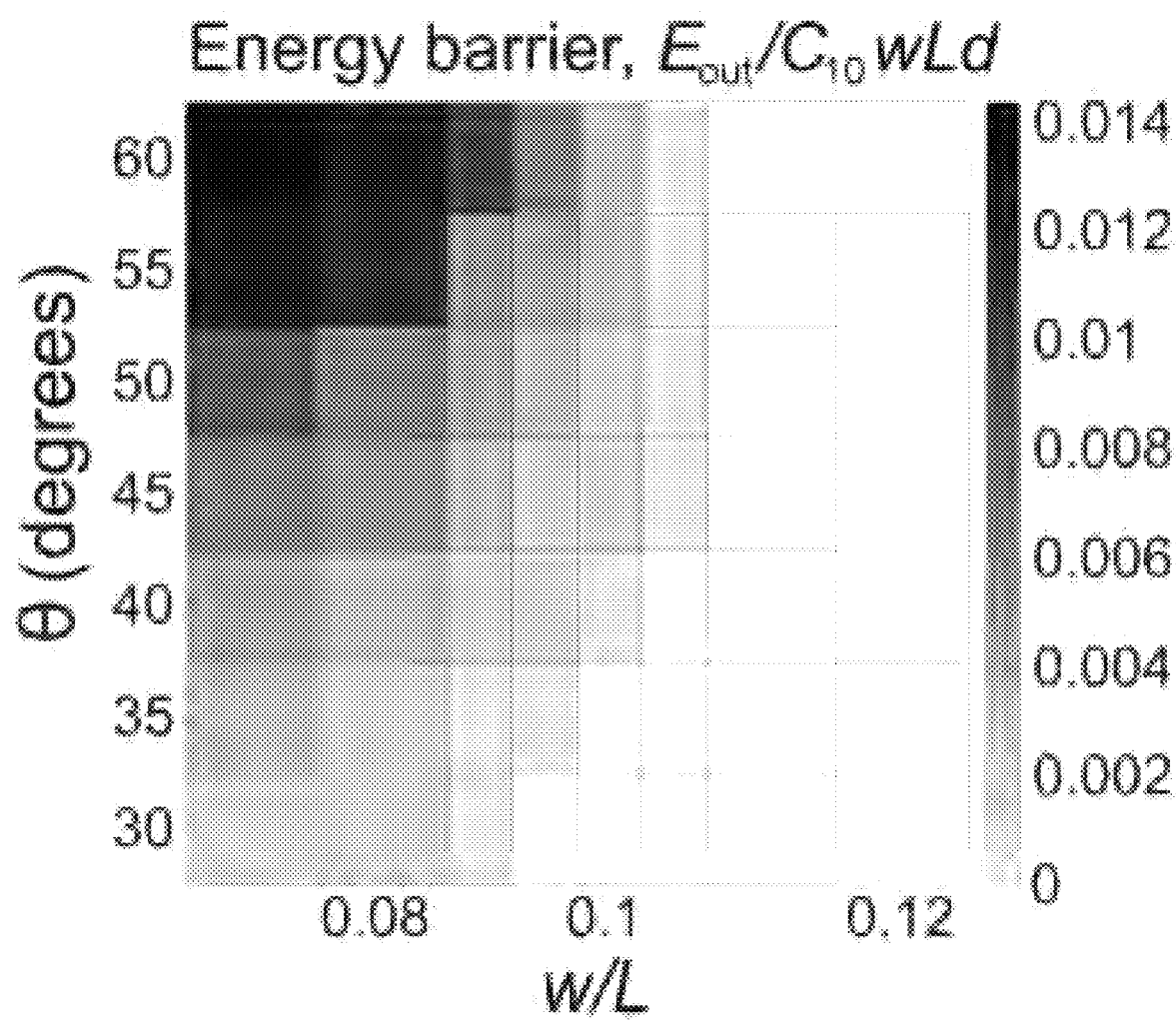
Figure 4D:
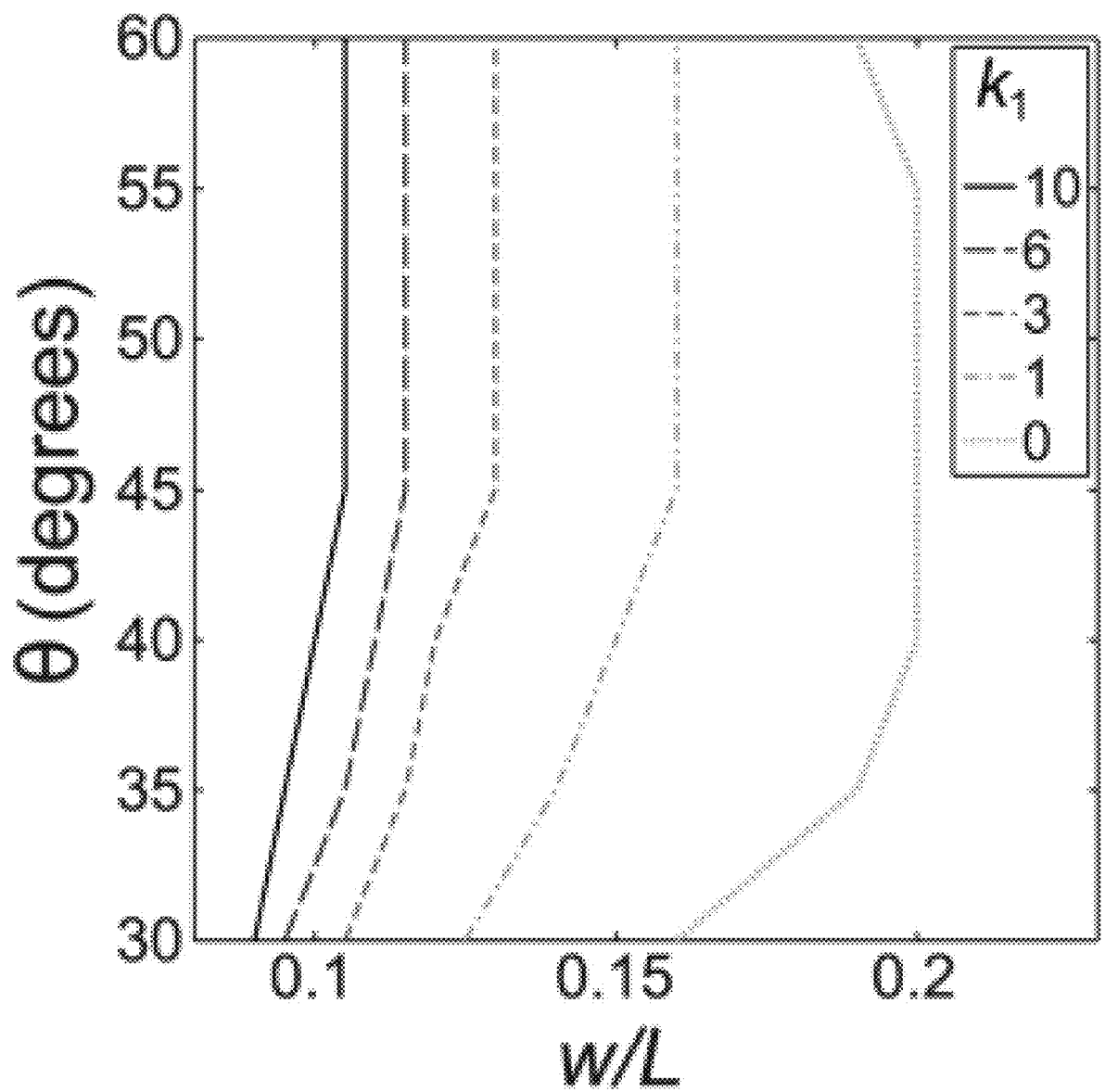

(note, $\hat{t}^*$ is used to indicate the time of actuation predicted by equation (2), and $t^*$ to indicate the measured time). FIG. 3D demonstrates how different $w_0/L_0$ values produce different $t^*$ in accordance with equation (2). Illustrative samples have been printed with widths of 600-850 µm and lengths of 7-9 mm. The actuation time ranges from about 0.6 s to 108 s, which almost spans the range of theoretically predicted times (0 to 130 s) by equation (2).

Because B and $\eta_T$ are unitless and D is an intrinsic parameter, the maximum actuation time for a beam with slenderness ratio $w_0/L_0$ would scale like $w_0^2$. For example, if the beams were made an order of magnitude smaller (e.g., around 85 µm in width) the range of available actuation times would decrease from roughly 0-130 s to 0-1.3 s. For any length scale, the theoretical upper bound of the actuation time is the time to saturation, $t_s=w_0^2/8D$, and the theoretical lower bound can be arbitrarily close to zero, as $w_0/L_0$ can always be chosen to satisfy $B-w_0/L_0 \to 0$. In reality, small perturbations in environmental conditions and fabrication limitations in beam geometry make infinitesimal $\hat{t}^*$ unachievable and increase the uncertainty in experimental actuation time at these smaller values.

Despite the simplistic assumptions in the model, it was found that the average discrepancy between $\hat{t}^*$ and $t^*$ was about 17% for samples designed to actuate more than 20 s after exposure to the stimulus. As this time is reduced, the relative error of the model increases. For example, for samples designed to actuate at times <5 s after exposure to the stimulus, the relative error of the model increases to about 44%.

If one allows the solvent to evaporate, the beams return to their initial geometric parameters ($w_0/L_0$), and are once again bistable. External energy is required to reset the units to the higher-energy state in order to reuse them. At ambient conditions, the drying time is about 70 min (though this could be smaller or larger depending on the length scale of the system) after which the units can be reset to the higher-energy state by compression (to buckle the beams again). Repeated tests (actuation-drying-resetting-actuation) were performed on five units and found that the intra-sample variability of actuation time is comparable to the inter-sample variability discussed above.

Demonstrations of Embodied Logic

In addition to the control of actuation time, self-actuating systems that consist of multiple actuating units (each of which can be a different material, to respond to different stimuli) can be constructed. There are many ways that these can be arranged, leading to different possible system functions of varying complexity.

One can utilize a shorthand to describe some of these possible functions: First, one can indicate a functional event in bold followed in parentheses by the condition that is necessary for that event to occur; example functions include Open and Close, referring, e.g., to the opening or closing of a box. Second, the application of a stimulus can be indicated by the symbol S with an appropriate subscript; here, stimuli can include $S_{toluene}$ (which actuates PDMS-based materials), $S_{water}$ (which actuates hydrogel-based materials), and $S_{mass}$ (which refers to placing a mass on the structure). For example, Open(S water) would indicate that a structure should open when exposed to water, which would be accomplished by using a hydrogel-based material to actuate.

Finally, if multiple stimuli must occur within some time interval, this is indicated by a value assigned to $\Delta t^*$. As a first example, one can 3D print a box (see Methods) which is designed to autonomously open when exposed to toluene, but then to close again after a defined interval of time (e.g., 20 s). This behavior can be written as TimedOpen ($S_{toulene}|\Delta t^*=20$ s). To open and then close the box two actuation events were needed, which were accomplished by integrating two PDMS-GF actuating units with the box, each with different values of $w_0/L_0$. These values are chosen such that simultaneous exposure to toluene will cause them to reach the phase boundary, B, 20 s apart. In the results (not all shown), after exposure to toluene, the right unit actuates first, opening the box. Then, after approximately 20 s, the left unit actuates and closes the box.

The second demonstration mimics the rapid closing of the Venus flytrap when an object (denoted $S_{mass}$) is placed on a waiting ledge, with the added requirement that the trap is only in operation if a chemical signal (toluene) has been applied. One can represent this behavior as Close($S_{toluene} \wedge S_{mass}$). The trap is locked until a PDMS-based unit actuates, preventing the lobes from closing until $t \geq t^*$ even if a load is applied before then.

Figure 5A:
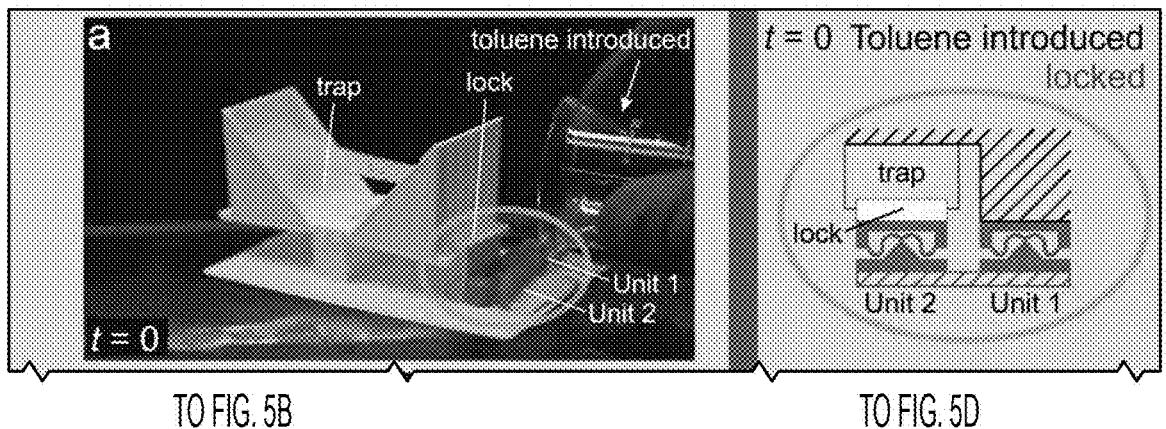
FIGS. 5A-5F illustrates an exemplary "flytrap" device with embodied logic as described by Close($S_{toluene}$, $S_{mass}|t*_{mass}-t_1*<t_2*-t_1*$). Here, (FIG. 5A) illustrates that toluene is applied to a flytrap-inspired system which is prevented from closing by a lock that is toggled by two actuating units.
Figure 5B:
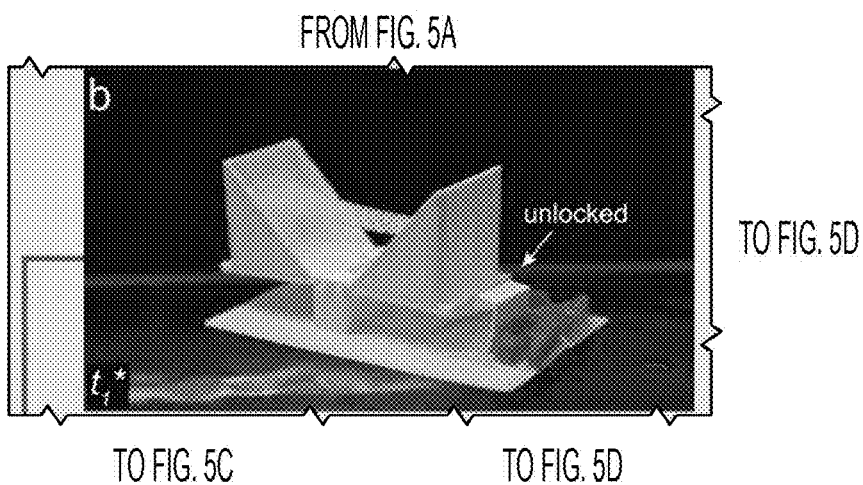
Figure 5C:
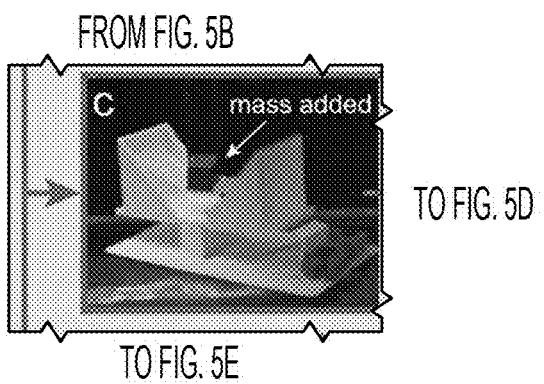
Figure 5D:
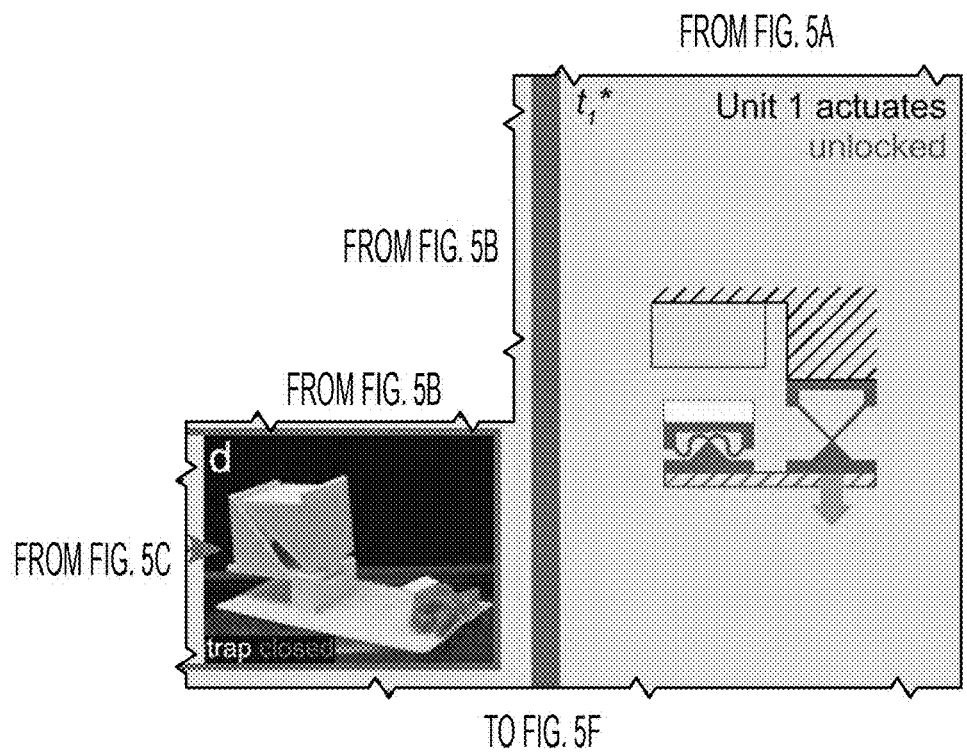
Figure 5E:
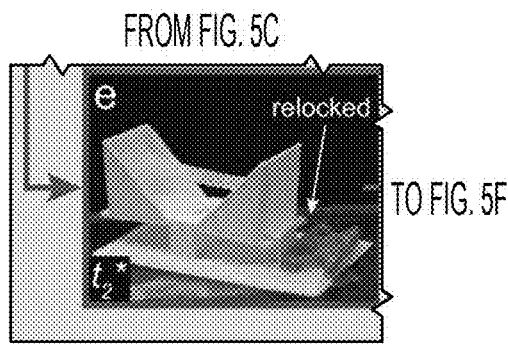
Figure 5F:
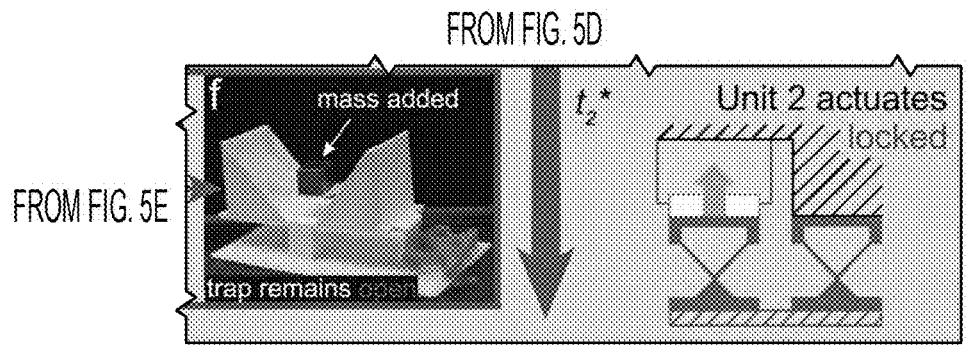

FIGS. 5A-5E (all panels) shows a similar Venus flytrap-inspired example, but with more complex control logic. In this example, there are two actuating units made from PDMS-GF which are designed to actuate 10 s apart (FIG. 5A). The first of these (which actuates at $t_1^*$) activates the system by removing the lock (as in FIG. 5B) while the second (which actuates at $t_2^*$) re-locks the flytrap, once again preventing it from closing. If a mass is placed on a platform in the center of the flytrap at a time between $t_1^*$ and $t_2^*$ (i.e., when the lock is disengaged) the lobes will close (FIGS. 5C-5D). If the mass is placed on the platform when the lock is engaged (e.g., after $t_2^*$ as in FIGS. 5E-5F) it will have no effect. This functionality is described by Close ($S_{toluene}$, $S_{mass}|t_{mass}-t_1^*<t_2^*-t_1^*$), where the comma indicates an ordered list of stimuli, and $t_2^*-t_1^*=10$ s.

Figure 6A:
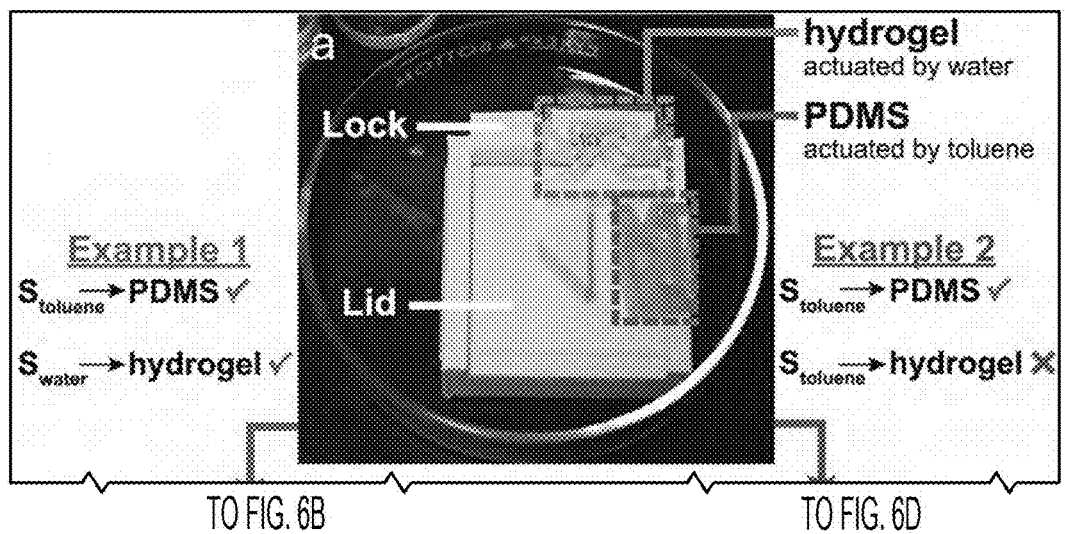
FIGS. 6A-6E provides an example of a multimaterial responsive system, specifically, one described by Open ($S_{water}/\backslash S_{toluene}|t_{hydrogel}*<t_{PDMS}*$). Here, (FIG. 6A) provides a box with a lid which is unlocked upon actuation of a hydrogel-based unit (at time $t_{hydrogel}$*) and subsequently opened upon actuation of a PDMS-based unit (at time $t_{PDMS}$*), (FIG. 6B and FIG. 6C) provide via Example 1 that if water is applied to the hydrogel-based unit and toluene to the PDMS-based unit, the lid is unlocked and then pushed open, successfully opening the box, (FIG. 6D) provides in Example 2 that if toluene is applied to both units, the PDMS-based unit actuates as it should, but because the hydrogel-based unit is unresponsive to toluene, the lock interferes and the lid remains closed, (panel 6E) provides a diagram representing the system logic and the behaviors of the system in Examples 1 and 2.
Figure 6B:
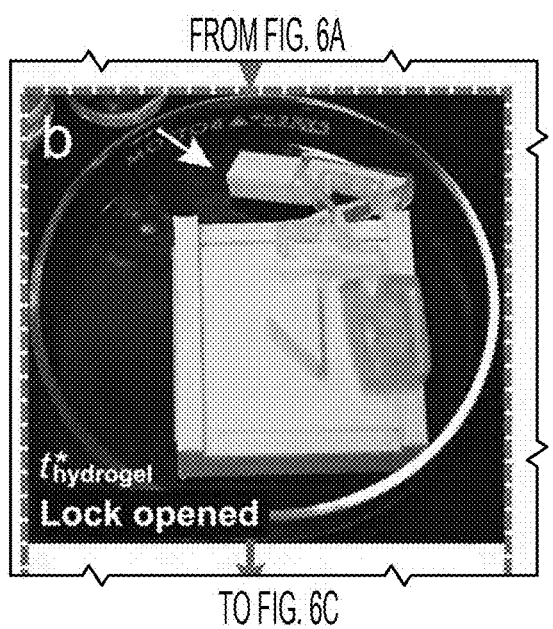
Figure 6C:
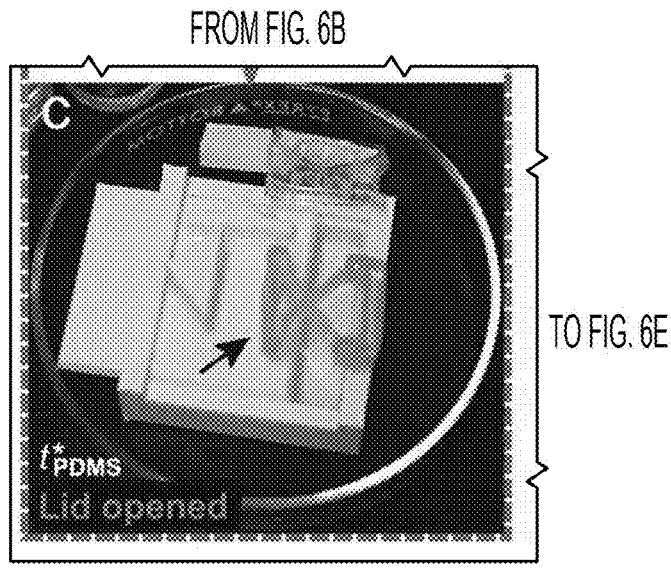
Figure 6D:
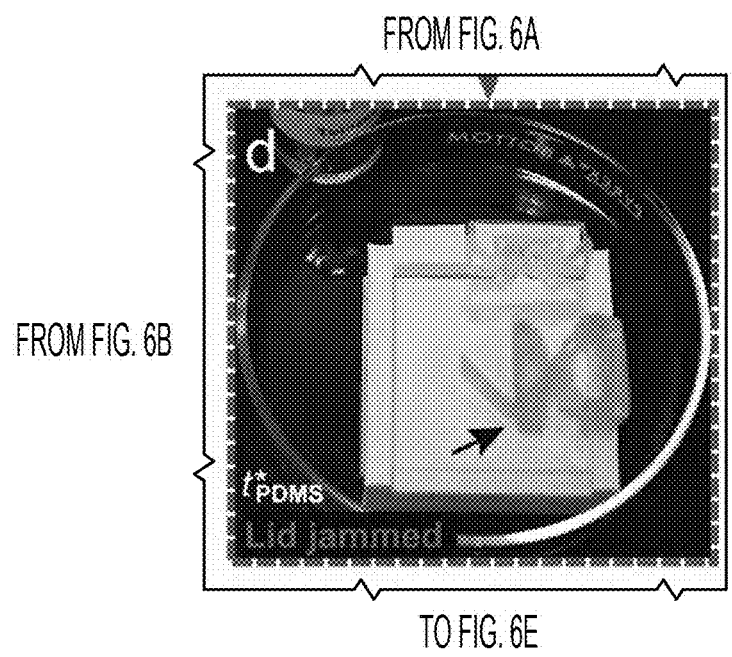
Figure 6E:
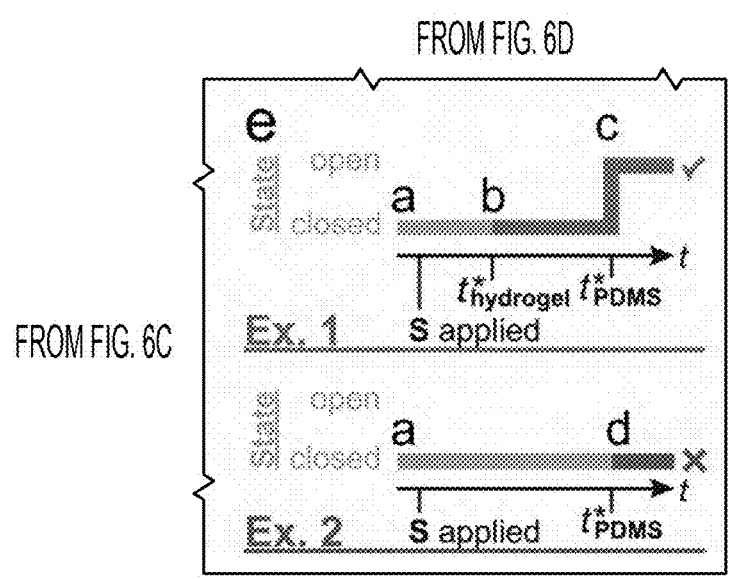
Figure 7A:
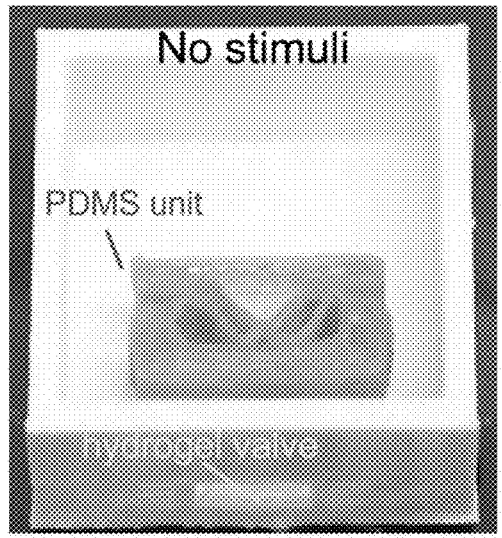
FIGS. 7A-7D: Demonstration of AND gate behavior.
Figure 7B:
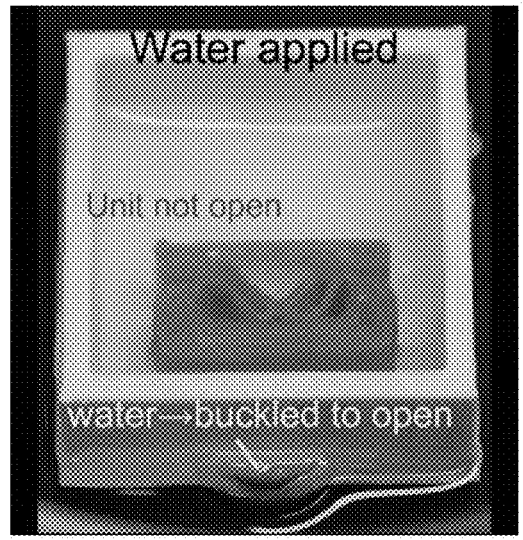
Figure 7C:
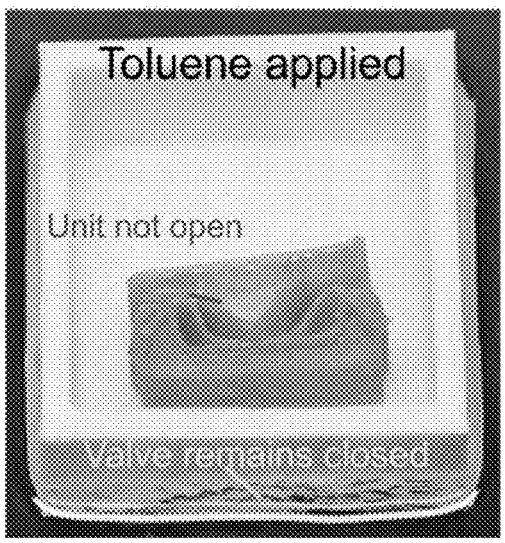
Figure 7D:

Finally, FIGS. 6A-6E (all panels) demonstrates a multi-stimuli responsive system[67,68], which uses two materials that respond to two orthogonal stimuli (i.e., hydrogel, which responds to water, and PDMS, which responds to a non-polar solvent such as toluene). One can compose a box which follows the behavior Open ($S_{water} \wedge S_{toluene}|t_{hydrogel}^*<t_{PDMS}^*$), as shown in FIG. 6A. Application of $S_{water}$ causes the hydrogel-based unit to actuate, opening a lock (at time $t_{hydrogel}^*$) which otherwise obstructs the opening of the lid. Application of Stoluene causes the PDMS-based unit to actuate (at time $t_{PDMS}^*$), pushing open the lid if it has been unlocked (FIGS. 20B-20C). If instead one applies only toluene, the hydrogel-based lock does not respond, and the box remains closed even when the PDMS-based unit pushes on the lid (FIGS. 6D-6E). This capability could be used, for example, to produce a sampling box that autonomously opens when it encounters an oil-water interface, without any external power or solid state sensors and actuators.

These principles can be further extended to 2D or 3D by designing more complicated arrangements of beams. As a demonstration of this, 2D samples were manufactured using PDMS-based materials and illustrated autonomous deployment due to the presence of toluene.

Discussion

In summary, provided are 3D printed systems of self-actuating structures capable of simple logic (AND, OR, and NAND) and controlled timing of actuation in response to multiple stimuli. This is accomplished using PDMS-based and hydrogel-based materials that respond to different environmental stimuli. Due to the use of short fiber composites and the alignment of the fibers during extrusion, the beams swell anisotropically in the presence of suitable stimuli, triggering rapid and large-amplitude configuration changes at predetermined times (as the geometric parameter $w_0/L_0$ passes a bifurcation point).

Using solely architected soft materials as self-actuating functional elements, the disclosed approach enables complex function and control of timing in response to multiple stimuli. Several autonomous responsive systems in this work are demonstrated as examples of this approach, all performing their designated functions without mechatronics, traditional control systems, or tethering. This includes a hopper that autonomously jumps when an undesired chemical is introduced, a "flytrap" that only closes if mechanically stimulated during a pre-programmed interval of time, and a box that only opens if it encounters both non-polar solvents and water.

While this work focuses on the autonomous release of strain energy to produce precise actuation events, these concepts can be integrated with more complex systems. For example, advances from soft robotics, such as the integration of pneumatic or chemical energy sources[69], can allow units to be autonomously reset to allow repeated actuation events. The nonlinear behavior of the beams (e.g., the location of the bifurcation points in parameter space) is scale-independent, and therefore the systems can be scaled down or up as can be necessary for additional applications, e.g., in soft robotics, biomedical devices, and deployable structures. Further, it should be understood that although the illustrative devices described herein made use of materials that respond to non-polar solvents or to water, the disclosed technology applies to matrices that respond to other cues (e.g., light, temperature, and electric potential) as long as the printed materials are anisotropic.

Example Methods
Ink Preparation and 3D Printing

PDMS and glass fibers were mixed under vacuum, and then transferred to a syringe and centrifuged. Nozzles with an inner diameter of 410 μm were used for PDMS-based ink printing. The hydrogel had an N-isopropylacrylamide (NIPAm) network and nanofibrillated cellulose (NFC) as filler. After preparation of the ink (see below), the ink was printed through a nozzle of diameter 250 μm. Two parallel filaments of the hydrogel-based ink were printed and then PDMS is injected in between to form a hydrogel beam. A 3D translation stage controls motion of the nozzle during printing. The PDMS-based ink was thermally cured and epoxy is cast and cured to provide desired boundary conditions. The hydrogel-based ink was cured by UV crosslinking and then mounted on 3D printed polylactic acid (PLA) pieces. Fused deposition modeling (FDM) was used for fabrication of parts for demonstrations, with the functional PDMS or hydrogel units integrated with these. Parts were fabricated on a MakerGear M2. A nozzle of diameter 0.25 mm was used at an extrusion temperature of 190° C., a bed temperature of 65° C., and speeds of 30 to 80 mm/s.

Ink Preparation
PDMS-Based Inks

A protocol for an exemplary PDMS-based ink follows. PDMS (SE 1700 and Sylgard® 184, Dow Corning Co.) and glass fibers (Fibre Glast Co.) are mixed (SpeedMixer™, FlackTek, Inc) at 1500 rpm for 45 s, 1800 rpm for 30 s and 1200 rpm for 2 min under 20 Torr vacuum. The ratio of SE 1700 to Sylgard® 184 was 85:15 for 0 and 5 vol % glass fiber ink, and 83:17 for 10, 12, and 15 vol % glass fiber inks. The base to cross linker ratio is 10:1 for both SE 1700 and Sylgard® 184. The glass fibers are observed to be ~540 μm in length and 14.6±1.53 μm in width as received from the manufacturer, but the length decreases to 72.9±17.3 μm during mixing. The mixed ink is then transferred to a syringe and centrifuged (ST 8 Centrifuge, Thermo Scientific®) at 3400 rpm for 13 min, and a deposition nozzle is connected to the syringe barrel via Luer lock (Nordson EFD®). In this study, nozzles with an inner diameter of 410 μm are used for all PDMS-based ink printing.

It should be understood that the use of PDMS and glass fibers is illustrative only and does not serve to limit the scope of the present disclosure. Other matrix materials besides PDMS can be used, and similarly other reinforcement materials besides glass fibers can be used. Carbonaceous materials (e.g. carbon fibers and carbon nanotubes) can be used. Metallic fibers can be used, as well. Polymeric bodies (e.g., polymeric fibers) can be dispersed in the matrix material as a reinforcement material.

Hydrogel-Based Inks

A protocol for an exemplary hydrogel-based ink follows. First, nanofibrillated cellulose (NFC) is diluted in DI water, which is deoxygenated under nitrogen flow for 30 min, and mixed at 800 rpm for 15 s and 1500 rpm for 1 min in a capped container. Synthetic hectorite clay (Laponite XLG) is then added under nitrogen flow and mixed at 1800 rpm for 3 min and 1500 rpm for 2 min. The clay solution was additionally hand mixed if white aggregates were seen. N-isopropylacrylamide (NIPAm) was then added to the clay solution under nitrogen flow and mixed again at 1800 rpm for 3 min and 1500 rpm for 2 min. Irgacure 2959, the ultraviolet photoinitiator, is added and the ink is mixed at 1500 rpm for 2 min. The mass percentage of these components are DI water:NFC:Laponite clay:NIPAm:Irgacure=81:0.77:10:8.1:0.12. Finally, 5 wt % PDMS (Sylgard® 184 with 10% crosslinker) is added and mixed at 800 rpm for 1 min.

The mixed ink is then transferred to a syringe and centrifuged at 3400 rpm for 13 min. A metal straight nozzle with outlet diameter of 250 μm is used for hydrogel-based ink printing. Because the hydrogel has a more time-dependent mechanical response than the printed PDMS, it was more challenging to obtain the desired bistable response. To improve this, each hydrogel beam was actually fabricated as a composite: first, two parallel filaments of the hydrogel-based ink were printed, separated by a small amount (on the order of the filament width), then PDMS (Sylgard® 184) was extruded in between. The PDMS provided a more robust elastic response of the overall beam, but the hydrogel still fully enclosed the PDMS so that the composite beam only becomes swollen in the presence of water.

Mechanical Testing

Tensile tests were performed on an Instron Model 5564 (displacement control), with tensile bars printed in either longitudinal or transverse directions relative to the loading direction. The nominal strain rate was constant at 1% for all tests. The actuation time associated with the snap-through of the structures was measured using a high speed camera (Photron AX200) at 2000 frames per second. Continuous shear rate ramp and stress sweep rheology tests were performed on a rheometer (TA Instruments® AR2000) at ambient temperature using a 20 mm parallel plate with a 140 μm gap size for both PDMS-GF and hydrogel-based inks.

Tensile bars using pure PDMS and PDMS-GF15 inks were fabricated by direct ink writing. Both longitudinal and transverse samples were prepared (i.e., fibers oriented parallel with and perpendicular to the loading direction, respectively). After curing, some samples were soaked in solvent (toluene) for 24 h, and other samples were not exposed to solvent ("dry").

Subsequently, an Instron Model 5564 was used to perform tensile tests on these samples in displacement control at a nominal strain rate 0.01 s$^{-1}$ for all samples. Three samples were tested for each case. The swollen samples, infused with solvent, showed lower stiffness compared with the dry samples, but in both cases the materials remained highly anisotropic.

Stress relaxation tests were also performed to confirm that the material was sufficiently elastic to maintain the modest strains associated with buckling without prohibitive viscoelastic relaxation. An Instron MicroTester Model 5848 was used, with a ramp to 10% strain, followed by a hold for 100 s and subsequent unloading. Stress relaxation was observed during the hold, such that the stress, σ, could be approximated by a power-law function, $\sigma=Kt^m$. For pure PDMS and PDMS-GF15 inks, the fitted exponents are $m_{PDMS}=-0.0095\pm0.0016$ and $m_{GF15}=-0.023\pm0.008$, respectively. Stress relaxation tests were performed at material strains comparable to those experienced during buckling, and these indicate a stable elastic response, ensuring that the beams can store elastic strain energy in a buckled configuration without prohibitive relaxation, as they must prior to actuation.

Printing

An exemplary printing protocol follows. A ShopBot® D2418 3D translation stage was used for control of movement of the syringe in 3D. Print paths were controlled by G-code or ShopBot® (G-code derivative) commands, which are generated by Python or Matlab® scripts. A volumetric dispenser (Ultra™ 2800, Nordson) or a pressure control box (EFD® Ultimus™ V) was used for control of ink extrusion flow rate. Samples are printed on a substrate of Teflon-coated aluminum foils at ambient temperature.

PDMS-based samples were cured in an oven (HERATherm, Thermo Scientific®) at 100° C. for 1 h. Hydrogel-based samples were cured via UV crosslinking (~60 mW/cm$^2$ for 300 s in OmniCure® Series 2000). Systems that include both materials were first UV cured and then thermally cured at 60° C. for 4 h in a capped container. In order to provide the desired boundary conditions for the beams, epoxy (Epon 828, resin:cross linker=3:1) was cast and cured at room temperature for more than 6 hours to provide rigid boundaries for both ends of each PDMS beam. The hydrogel-based units were mounted on 3D printed polylactic acid (PLA) pieces, to provide appropriate boundary conditions.

Direct Ink Writing (DIW)

DIW is an extrusion-based 3D printing technique[1,2] in which material is extruded from a translating deposition nozzle at ambient conditions, relying on non-Newtonian material rheology to produce a pattern that maintains its shape after extrusion. By decoupling the patterning step from the material cross-linking step, DIW offers a materials flexibility that allows one to meet the various criteria listed in the main text. The printed material can be shear-thinning, which facilitates easy extrusion from a fine nozzle. The printed material can also possess a viscoelastic yield stress (so that the material maintains its shape after it is deposited). Subsequent immobilization steps (thermal or UV crosslinking, sintering, etc.) can then be taken after the pattern is formed, as appropriate for the specific material, to obtain the desired materials properties.

Exemplary Embodiments

The following embodiments are exemplary only and do not serve to limit the scope of the present disclosure or of the attached claims.

Embodiment 1. An environmentally sensitive structure, comprising: a bistable element comprising an anisotropic material sensitive to an environmental stimulus, at least one portion of the bistable element being in mechanical communication with a support element, the bistable element being structured such that exposure of the anisotropic material to the environmental stimulus effects conversion of the bistable element to a monostable element, and the bistable element having a characteristic dimension that is changeable with exposure of the anisotropic material to the environmental stimulus.

The bistable element can be a beam or beam-shaped structure, but that is not a requirement. The bistable element can be polygonal in cross-section, but can also be circular or oblong or ovoid. The bistable element can have a constant cross-sectional area along its length, but that is not a requirement either, as a bistable element can have a cross-section that is not constant along its length. A bistable element can be straight in conformation, but can also be non-linear (e.g., curved) in one or more regions.

Embodiment 2. The environmentally sensitive structure of Embodiment 1, wherein the anisotropic material comprises a matrix material. Suitable matrix materials include, e.g., polymers such as elastomers and rubbers. PDMS is considered a particularly suitable matrix material, although other matrix materials can be used.

Embodiment 3. The environmentally sensitive structure of Embodiment 2, further comprising a plurality of bodies disposed within the matrix material.

Embodiment 4. The environmentally sensitive structure of Embodiment 3, wherein the bodies are characterized as nonspherical.

Embodiment 5. The environmentally sensitive structure of any one of Embodiments 3-4, wherein the plurality of bodies comprise major axes that are at least partially aligned with one another.

Embodiment 6. The environmentally sensitive structure of any one of Embodiments 3-5, wherein the bodies comprise fibers, platelets, tubes, or any combination thereof. It should be understood that the bodies can all be of the same size and/or composition, but this is not a requirement. An environmentally sensitive structure can include bodies that differ from one another in composition and/or size.

Embodiment 7. The environmentally sensitive structure of any one of Embodiments 2-6, wherein the matrix material is characterized as polymeric.

Embodiment 8. The environmentally sensitive structure of any one of Embodiments 2-7, wherein the matrix material is characterized as an elastomer, a hydrogel, or a thermoplastic. As described elsewhere herein, PDMS (polydimethylsiloxane) is considered an especially suitable matrix material.

Embodiment 9. The environmentally sensitive structure of any one of Embodiments 1-8, wherein the conversion of the bistable element to a monostable element is associated with a conversion of the bistable element between a first shape and a second stable shape.

Embodiment 10. The environmentally sensitive structure of any one of Embodiments 1-9, wherein the characteristic dimension is an aspect ratio of the bistable element. Such an aspect ratio can be a ratio between, e.g., a major axis of the bistable element and a minor axis of the bistable element. An aspect ratio can also be a ratio between any two dimensions (e.g., length:height, length:width, width:height) of the bistable element.

Embodiment 11. The environmentally sensitive structure of any one of Embodiments 1-10, wherein the characteristic dimension changes by from about 0.1% to about 50% (or more) when triggering the movement of the bistable element from the first shape to the second shape of the element.

As discussed elsewhere herein, a relatively small change in characteristic dimension can be associated with the transition between the first shape and the second shape. It should be understood that the change between first and second shapes can involve a change in shape in one, two, or three spatial axes.

Embodiment 12. The environmentally sensitive structure of any one of Embodiments 9-11, wherein (a) the first shape has associated with it a first potential energy, (b) the second stable state has associated with it a second potential energy, and (c) the conversion in the bistable element between the first shape and the second stable shape is effected by a potential energy in the bistable element that is from about 0.001% to about 99% (or from about 0.01 to about 99%, or from about 1 to about 90%, or from about 5 to about 85%, or from about 10 to about 80%, or from about 20 to about 70%, or from about 30 to about 60%, or even from about 40 to about 50%) greater than the greater of the first and second potential energies.

Embodiment 13. The environmentally sensitive structure of any one of Embodiments 10-12, wherein one of the first shape and the second shape is linear.

Embodiment 14. The environmentally sensitive structure of any one of Embodiments 10-13, wherein one of the first shape and the second stable shape comprises at least one non-linear portion. As but some examples, a stable shape can be a hook-shaped element, a C-shaped element, an S-shaped element, a V-shaped element, a U-shaped element, a Z-shaped element, a U-shaped element, an O-shaped element, an X-shaped element, a T-shaped element, other English letter-shaped elements, and the like.

Embodiment 15. The environmentally sensitive structure of Embodiment 14, wherein one of the first shape and the second stable shape comprises a plurality of non-linear portions.

Embodiment 16. The environmentally sensitive structure of any one of Embodiments 1-15, wherein the environmental stimulus is one or more of an aqueous material, a hydrocarbon material, a temperature, a radiation, a mechanical stimulus, or any combination thereof. Water, oil, heat (or cold), light, infrared radiation, ultraviolet radiation, and the like are all also effective stimuli. In this way, one can fabricate a device having a sensitivity to one, two, three, or more stimuli. As described elsewhere herein, a change in a feature and/or output of a device can be effected by exposing the device to a single stimulus, to one of several stimuli that by themselves (or in combination) give rise to effecting the change in feature and/or output of the device, or by exposing the device to two or multiple stimuli that cooperate to effect the change in feature and/or output of the device.

Embodiment 17. The environmentally sensitive structure of Embodiment 16, wherein the environmental stimulus is a non-polar hydrocarbon material. Oil, benzene, toluene, xylene, and the like are all suitable hydrocarbons.

Embodiment 18. The environmentally sensitive structure of Embodiment 16, wherein the environmental stimulus is acidic.

Embodiment 19. The environmentally sensitive structure of Embodiment 16, wherein the environmental stimulus is basic.

Embodiment 20. The environmentally sensitive structure of any one of Embodiments 1-19, wherein the conversion of the bistable element to a monostable element effects motion of an element in mechanical communication with the bistable element, the element optionally being a hatch, a spring, a lever, or a rotary union. As described elsewhere herein, the conversion of the bistable element can act to, e.g., open a hatch, close a hatch, rotate a structure, compress a structure, stretch a structure, or otherwise mechanically manipulate a structure.

Embodiment 21. The environmentally sensitive structure of any one of Embodiments 1-20, comprising a plurality of bistable elements. The bistable elements can be identical to one another (e.g., to allow for sensing of a stimulus at multiple locations), but this is not a requirement. The bistable elements can differ from one another in one or more of, e.g., size, shape, composition, length of time needed to convert from a bistable element to a monostable element, or even stimulus sensitivity. As one example, a structure can include a bistable element that is sensitive to water and another bistable element that is sensitive to oil.

Embodiment 22. A method, comprising exposing an environmentally sensitive structure according to any one of Embodiments 1-21 to the environmental stimulus so as to effect in the bistable element a conversion to a monostable element.

Embodiment 23. The method of Embodiment 22, wherein the exposure effects motion of an element in mechanical communication with the bistable element.

Embodiment 24. A device, comprising a plurality of environmentally sensitive structures according to any one of Embodiments 1-21. Such a device can be used as a sensor, a flow control device, to name but some example applications.

Embodiment 25. The device of Embodiment 24, wherein the conversion to a monostable element in different environmentally sensitive structures effects motion of different elements in mechanical communication with the different environmentally sensitive structures.

Embodiment 26. The device of any one of Embodiments 24-25, comprising a first environmentally sensitive structure and a second environmentally sensitive structure, the first environmentally sensitive structure and the second environmentally sensitive structure having different sensitivities to the same environmental stimulus.

Embodiment 27. A method of fabricating an environmentally sensitive structure, comprising: placing a portion of a bistable element that comprises an anisotropic material into mechanical communication with a support element, the anisotropic material of the bistable element being sensitive to an environmental stimulus, and the bistable element being constructed such that exposure to the environmental stimulus effects conversion of the bistable element to a monostable element, the placing being effected so as to give rise to an environmentally sensitive structure.

Embodiment 28. The method of Embodiment 27, wherein the method gives rise to an environmentally sensitive structure according to any one of Embodiments 1-21.

Embodiment 29. The method of Embodiment 28, further comprising constructing the bistable element. A bistable element can be fabricated by additive manufacturing, but this is not a requirement. A bistable element can also be fabricated by subtractive manufacture, e.g., via beginning with a workpiece and removing material from the workpiece so as to give rise to the bistable element having the desired dimensions.

Embodiment 30. The method of Embodiment 29, wherein the constructing comprises additive manufacture.

Embodiment 31. An environmentally sensitive structure, comprising: (i) a first bistable element comprising an anisotropic material sensitive to a first environmental stimulus, the first bistable element being structured such that exposure of the anisotropic material to the first environmental stimulus effects conversion of the first bistable element to a first monostable element, and the first bistable element having a characteristic dimension that is changeable with exposure of the anisotropic material to the first environmental stimulus; (ii) a second bistable element comprising an anisotropic material sensitive to a second environmental stimulus, the second bistable element being structured such that exposure of the anisotropic material to the first environmental stimulus effects conversion of the second bistable element to a second monostable element, and the second bistable element having a characteristic dimension that is changeable with exposure of the anisotropic material to the second environmental stimulus.

Such structures can be considered to include two different bistable elements, each of which is sensitive to a different environmental stimulus. As an example, a structure can include a first bistable element that is sensitive to hydrocarbons, and a second bistable element that is sensitive to water. Such a device could thus be used to sense one or both of hydrocarbons and water, e.g., a device used to detect leaks from a tank.

Embodiment 32. The environmentally sensitive structure of Embodiment 31, further comprising a structural element that is actuated by a change in the first bistable element to a first monostable element. Such a structural element can be, e.g., a switch, a lever, a gate, a hatch, a seal, a valve, and the like.

Embodiment 33. The environmentally sensitive structure of any one of Embodiments 31-32, further comprising a structural element that is actuated by a change in the second bistable element to a second monostable element. Suitable structural elements are described elsewhere herein.

Embodiment 34. The environmentally sensitive structure of any one of Embodiments 31-33, further comprising a structural element that is actuated by a change in the first bistable element to a first monostable element or a change in the second bistable element to a second monostable element. Such a device can be characterized as having an "OR" gate, in that exposure to either a stimulus that effects conversion of the first bistable element to a first monostable element or to a stimulus that effects conversion of the second bistable element to a second monostable element can effect an output (e.g., movement of a structural element) of the structure.

Embodiment 35. The environmentally sensitive structure of any one of Embodiments 31-34, further comprising a structural element that is actuated by a change in the first bistable element to a first monostable element and a change in the second bistable element to a second monostable element. Such a device can be characterized as having an "AND" gate, in that exposure to a stimulus that effects conversion of the first bistable element to a first monostable element and a stimulus that effects conversion of the second bistable element to a second monostable element can effect an output (e.g., movement of a structural element) of the structure.

Embodiment 36. The environmentally sensitive structure of any one of Embodiments 31-35, wherein the structure is configured to provide an output effected by cooperation of the change in the first bistable element to a first monostable element and a change in the second bistable element to a second monostable element. One can produce a NAND gate by connecting two units (corresponding to two inputs) and one output. The stiffness of these is tuned (via geometry) such that both inputs must actuate in order to close the output unit (i.e. 1+1→0).

Embodiment 37. A method, comprising: with a system comprising (a) a first bistable element comprising an anisotropic material sensitive to a first environmental stimulus to the first environmental stimulus such that exposure to the first environmental stimulus effects conversion of the first bistable element to a first monostable element and (b) a second bistable element comprising an anisotropic material sensitive to a second environmental stimulus such that exposure to the second environmental stimulus effects conversion of the second bistable element to a second monostable element, exposing the system to a stimulus such that the stimulus (i) effects conversion of the first bistable element to a first monostable element and (ii) effects conversion of the first bistable element to second monostable element, the conversion of the first bistable element and the conversion of the second bistable element cooperating to effect an output of the system.

As one example, the conversion of the first bistable element (to a first monostable element) and the conversion of the second bistable element (to a second monostable element) can act to "turn off" an output (e.g., a signal) that would otherwise remain "on" unless both the first and second bistable elements are converted to monostable elements.

As another example, the conversion of the first bistable element (to a first monostable element) and the conversion of the second bistable element (to a second monostable element) can act to "turn on" an output (e.g., a flow of material) that would otherwise remain "off" unless both the first and second bistable elements are converted to monostable elements.

Embodiment 38. A method, comprising: with a system comprising (a) a first bistable element comprising an anisotropic material sensitive to a first environmental stimulus to the first environmental stimulus such that exposure to the first environmental stimulus effects conversion of the first bistable element to a first monostable element and (b) a second bistable element comprising an anisotropic material sensitive to a second environmental stimulus such that exposure to the second environmental stimulus effects conversion of the second bistable element to a second monostable element, exposing the system to a stimulus such that an output of the system is effected by either (or both) of the conversion of the first bistable element to a first monostable element or the conversion of the second bistable element to a second monostable element.

As an example, either the conversion of the first bistable element (to a first monostable element) or the conversion of the second bistable element (to a second monostable element) can act singly to "turn on" an output (e.g., a flow of material) that would otherwise remain "off" unless either or both the first and second bistable elements are converted to monostable elements.

It should be understood that one can use bistable elements in a device that differ from one another in stimulus sensitivity as well as differ in actuating timing, i.e., the length of time required to convert from a bistable state to a monostable state. This allows the sequencing of actuation events, for example, to open an environmental sampling container for a defined, temporary period of time Accordingly, as described elsewhere herein, by selection of anisotropic units (each of which can have its own stimulus sensitivity and/or actuation timing), one can confer complex control on material-structure combinations.

REFERENCES

Skotheim, J. M. Physical Limits and Design Principles for Plant and Fungal Movements. Science 308, 1308-1310 (2005).

Burgert, I. & Fratzl, P. Actuation systems in plants as prototypes for bioinspired devices. Philos. Trans. R. Soc. A Math. Phys. Eng. Sci. 367, 1541-1557 (2009).

Elbaum, R., Zaltzman, L., Burgert, I. & Fratzl, P. The role of wheat awns in the seed dispersal unit. Science 316, 884-886 (2007).

Reyssat, E. & Mahadevan, L. Hygromorphs: from pine cones to biomimetic bilayers. J. R. Soc. Interface 6, 951-957 (2009).

Rafsanjani, A., Brulé, V., Western, T. L. & Pasini, D. Hydro-responsive curling of the resurrection plant *Selaginella lepidophylla*. Sci. Rep. 5, 8064 (2015).

Forterre, Y., Skotheim, J. M., Dumais, J. & Mahadevan, L. How the Venus flytrap snaps. Nature 433, 421-425 (2005).

Volkov, A. G., Adesina, T., Markin, V. S. & Jovanov, E. Kinetics and Mechanism of Dionaea muscipula Trap Closing. Plant Physiol. 146, 694-702 (2007).

Yang, R., Lenaghan, S. C., Zhang, M. & Xia, L. A mathematical model on the closing and opening mechanism for Venus flytrap. Plant Signal. Behav. 5, 968-978 (2010).

Wehner, M. et al. An integrated design and fabrication strategy for entirely soft, autonomous robots. Nature 536, 451-455 (2016).

Leong, T. G. et al. Tetherless thermobiochemically actuated microgrippers. Proc. Natl. Acad. Sci. 106, 703-708 (2009).

Jin, B. et al. Programming a crystalline shape memory polymer network with thermo- and photo-reversible bonds toward a single-component soft robot. Sci. Adv. 4, eaao3865 (2018).

Wani, O. M., Zeng, H. & Priimagi, A. A light-driven artificial flytrap. Nat. Commun. 8, 15546 (2017).

Fernandes, R. & Gracias, D. H. Self-folding polymeric containers for encapsulation and delivery of drugs. Adv. Drug Deliv. Rev. 64, 1579-1589 (2012).

Shim, T. S., Kim, S. H., Heo, C. J., Jeon, H. C. & Yang, S. M. Controlled origami folding of hydrogel bilayers with sustained reversibility for robust microcarriers. Angew. Chemie—Int. Ed. 51, 1420-1423 (2012).

Hines, L., Petersen, K., Lum, G. Z. & Sitti, M. Soft Actuators for Small-Scale Robotics. Adv. Mater. 29, 1603483 (2017).

Jeon, S. J., Hauser, A. W. & Hayward, R. C. Shape-Morphing Materials from Stimuli-Responsive Hydrogel Hybrids. Acc. Chem. Res. 50, 161-169 (2017).

Studart, A. R. & Erb, R. M. Bioinspired materials that self-shape through programmed microstructures. Soft Matter 10, 1284-1294 (2014).

White, T. J. & Broer, D. J. Programmable and adaptive mechanics with liquid crystal polymer networks and elastomers. Nat. Mater. 14, 1087-1098 (2015).

Zeng, H., Wasylczyk, P., Wiersma, D. S. & Priimagi, A. Light Robots: Bridging the Gap between Microrobotics and Photomechanics in Soft Materials. Adv. Mater. 30, 1703554 (2017).

Ko, H. & Javey, A. Smart Actuators and Adhesives for Reconfigurable Matter. Acc. Chem. Res. 50, 691-702 (2017).

Stuart, M. A. C. et al. Emerging applications of stimuli-responsive polymer materials. Nat. Mater. 9, 101-113 (2010).

Yan, X., Wang, F., Zheng, B. & Huang, F. Stimuli-responsive supramolecular polymeric materials. Chem. Soc. Rev. 41, 5869-6216 (2012).

Momeni, F., M. Mehdi Hassani. N, S., Liu, X. & Ni, J. A review of 4D printing. Mater. Des. 122, 42-79 (2017).

Boothby, J. M., Kim, H. & Ware, T. H. Shape changes in chemoresponsive liquid crystal elastomers. Sensors Actuators B Chem. 240, 511-518 (2017).

Ge, Q., Qi, H. J. & Dunn, M. L. Active materials by four-dimension printing. Appl. Phys. Lett. 103, 131901 (2013).

Na, J. H. et al. Programming reversibly self-folding origami with micropatterned photo-crosslinkable polymer trilayers. Adv. Mater. 27, 79-85 (2015).

Liu, K., Wu, J., Paulino, G. H. & Qi, H. J. Programmable Deployment of Tensegrity Structures by Stimulus-Responsive Polymers. Sci. Rep. 7, 3511 (2017).

Bakarich, S. E., Gorkin, R., Panhuis, M. In Het & Spinks, G. M. 4D printing with mechanically robust, thermally actuating hydrogels. Macromol. Rapid Commun. 36, 1211-1217 (2015).

Ambulo, C. P. et al. Four-dimensional printing of liquid crystal elastomers. ACS Appl. Mater. Interfaces 9, 37332-37339 (2017).

López-Valdeolivas, M., Liu, D., Broer, D. J. & Sanchez-Somolinos, C. 4D Printed Actuators with Soft-Robotic Functions. Macromol. Rapid Commun. 39, 1700710 (2017).

Kotikian, A., Truby, R. L., Boley, J. W., White, T. J. & Lewis, J. A. 3D Printing of Liquid Crystal Elastomeric Actuators with Spatially Programed Nematic Order. Adv. Mater. 30, 1706164 (2018).

Oosten, C. L. Van, Bastiaansen, C. W. M. & Broer, D. J. Printed artificial cilia from liquid-crystal network actuators modularly driven by light. Nat. Mater. 8, 677-682 (2009).

Zeng, H., Wani, O. M., Wasylczyk, P., Kaczmarek, R. & Priimagi, A. Self-Regulating Iris Based on Light-Actuated Liquid Crystal Elastomer. Adv. Mater. 29, 1701814 (2017).

Rogóż, M., Zeng, H., Xuan, C., Wiersma, D. S. & Wasylczyk, P. Light-Driven Soft Robot Mimics Caterpillar Locomotion in Natural Scale. Adv. Opt. Mater. 4, 1689-1694 (2016).

Shankar, M. R. et al. Contactless, photoinitiated snap-through in azobenzene-functionalized polymers. Proc. Natl. Acad. Sci. 110, 18792-18797 (2013).

Hubbard, A. M., Mailen, R. W., Zikry, M. A., Dickey, M. D. & Genzer, J. Controllable curvature from planar polymer sheets in response to light. Soft Matter 13, 2299-2308 (2017).

Tavakol, B. & Holmes, D. P. Voltage-induced buckling of dielectric films using fluid electrodes. Appl. Phys. Lett. 108, 112901 (2016).

Pelrine, R., Kornbluh, R., Pei, Q. & Joseph, J. High-Speed Electrically Actuated Elastomers with Strain Greater Than 100%. Science 287, 836-840 (2000).

Cao, J. et al. Untethered soft robot capable of stable locomotion using soft electrostatic actuators. Extrem. Mech. Lett. 21, 9-16 (2018).

Gladman, A. S., Matsumoto, E. A., Nuzzo, R. G., Mahadevan, L. & Lewis, J. A. Biomimetic 4D printing. Nat. Mater. 15, 413-418 (2016).

Raviv, D. et al. Active printed materials for complex self-evolving deformations. Sci. Rep. 4, 7422 (2014).

Stoychev, G., Guiducci, L., Turcaud, S., Dunlop, J. W. C. & Ionov, L. Hole-Programmed Superfast Multistep Folding of Hydrogel Bilayers. Adv. Funct. Mater. 26, 7733-7739 (2016).

Wu, J. et al. Multi-shape active composites by 3D printing of digital shape memory polymers. Sci. Rep. 6, 24224 (2016).

Chen, T., Bilal, O. R., Shea, K. & Daraio, C. Harnessing bistability for directional propulsion of soft, untethered robots. Proc. Natl. Acad. Sci. 115, 5698-5702 (2018).

Zhang, X. et al. Optically- and thermally-responsive programmable materials based on carbon nanotube-hydrogel polymer composites. Nano Lett. 11, 3239-3244 (2011).

Abdullah, A. M., Braun, P. V. & Hsia, K. J. Programmable shape transformation of elastic spherical domes. Soft Matter 12, 6184-6195 (2016).

Boothby, J. M. & Ware, T. H. Dual-responsive, shape-switching bilayers enabled by liquid crystal elastomers. Soft Matter 13, 4349-4356 (2017).

Hu, N. & Burgueño, R. Buckling-induced smart applications: Recent advances and trends. Smart Mater. Struct. 24, 63001 (2015).

Bertoldi, K., Vitelli, V., Christensen, J. & Van Hecke, M. Flexible mechanical metamaterials. Nat. Rev. Mater. 2, 17066 (2017).

Kochmann, D. & Bertoldi, K. Exploiting microstructural instabilities in solids and structures: from metamaterials to structural transitions. Appl. Mech. Rev. 69, (2017).

Shan, S. et al. Multistable Architected Materials for Trapping Elastic Strain Energy. Adv. Mater. 27, 4296-4301 (2015).

Restrepo, D., Mankame, N. D. & Zavattieri, P. D. Phase transforming cellular materials. Extrem. Mech. Lett. 4, 52-60 (2015).

Correa, D. M., Seepersad, C. C. & Haberman, M. R. Mechanical design of negative stiffness honeycomb materials. Integr. Mater. Manuf. Innov. 4, 10 (2015).

Wang, P., Casadei, F., Shan, S., Weaver, J. C. & Bertoldi, K. Harnessing buckling to design tunable locally resonant acoustic metamaterials. Phys. Rev. Lett. 113, 14301 (2014).

Kang, S. H. et al. Complex ordered patterns in mechanical instability induced geometrically frustrated triangular cellular structures. Phys. Rev. Lett. 112, 1-5 (2014).

Raney, J. R. et al. Stable propagation of mechanical signals in soft media using stored elastic energy. Proc. Natl. Acad. Sci. 113, 9722-9727 (2016).

Lee, H., Xia, C. & Fang, N. X. First jump of microgel; actuation speed enhancement by elastic instability. Soft Matter 6, 4342-4345 (2010).

Yang, X. et al. Bio-Inspired Fast Actuation by Mechanical Instability of Thermoresponding Hydrogel Structures. J. Appl. Mech. 83, 71005 (2018).

Che, K., Yuan, C., Wu, J., Jerry Qi, H. & Meaud, J. Three-Dimensional-Printed Multistable Mechanical Metamaterials With a Deterministic Deformation Sequence. J. Appl. Mech. 84, 11004 (2016).

Holzapfel, G. A., Gasser, T. C. & Ogden, R. W. A new constitutive framework for arterial wall mechanics and a comparative study of material models. J. Elast. 61, 1-48 (2000).

Lee, H., Zhang, J., Jiang, H. & Fang, N. X. Prescribed pattern transformation in swelling gel tubes by elastic instability. Phys. Rev. Lett. 108, 214304 (2012).

Raney, J. R. & Lewis, J. A. Printing mesoscale architectures. MRS Bull. 40, 943-950 (2015).

Lewis, J. A. Direct ink writing of 3D functional materials. Adv. Funct. Mater. 16, 2193-2204 (2006).

Compton, B. G. & Lewis, J. A. 3D-Printing of Lightweight Cellular Composites. Adv. Mater. 26, 5930-5935 (2014).

Halpin, J. C. & Kardos, J. L. The Halpin-Tsai equations: A review. Polym. Eng. Sci. 16, 344-352 (1976).

Lee, J. N., Park, C. & Whitesides, G. M. Solvent compatibility of poly (dimethylsiloxane)-based microfluidic devices. Anal. Chem. 75, 6544-6554 (2003).

Thérien-Aubin, H., Wu, Z. L., Nie, Z. & Kumacheva, E. Multiple shape transformations of composite hydrogel sheets. J. Am. Chem. Soc. 135, 4834-4839 (2013).

Morales, D. et al. Ionoprinted multi-responsive hydrogel actuators. Micromachines 7, 98 (2016).

Wehner, M. et al. Pneumatic Energy Sources for Autonomous and Wearable Soft Robotics. Soft Robot. 1, 263-274 (2014).

Raney, J. R. & Lewis, J. A. Printing mesoscale architectures. MRS Bull. 40, 943-950 (2015).

Lewis, J. A. Direct ink writing of 3D functional materials. Adv. Funct. Mater. 16, 2193-2204 (2006).

Halpin, J. C. Effects of Environmental Factors on Composite Materials. Tech. Rep. Afml-Tr-67-423 (1969).

Halpin, J. C. & Kardos, J. L. The Halpin-Tsai equations: A review. Polym. Eng. Sci. 16, 344-352 (1976).

Shan, S. et al. Multistable Architected Materials for Trapping Elastic Strain Energy. Adv. Mater. 27, 4296-4301 (2015).

Holzapfel, G. A., Gasser, T. C. & Ogden, R. W. A new constitutive framework for arterial wall mechanics and a comparative study of material models. J. Elast. 61, 1-48 (2000).

Chao, K. P., Wang, V. S., Yang, H. W. & Wang, C. I. Estimation of effective diffusion coefficients for benzene and toluene in PDMS for direct solid phase microextraction. Polym. Test. 30, 501-508 (2011).

Alexander, M., Boscaini, E., Lindinger, W. & Mark, T. D. Membrane introduction proton-transfer reaction mass spectrometry. Int. J. Mass Spectrom. 223-224, 763-770 (2003).

What is claimed is:

1. An environmentally sensitive structure, comprising:
   a bistable element comprising an anisotropic material sensitive to an environmental stimulus,
   at least one portion of the bistable element being in mechanical communication with a support element,
   the bistable element being structured such that exposure of the anisotropic material to the environmental stimulus effects conversion of the bistable element from a bistable shape to a monostable shape, and
   the bistable element having a characteristic dimension that changes with conversion of the bistable element from the bistable shape to the monostable shape upon exposure of the anisotropic material to the environmental stimulus.

2. The environmentally sensitive structure of claim 1, wherein the anisotropic material comprises a matrix material.

3. The environmentally sensitive structure of claim 2, further comprising a plurality of bodies disposed within the matrix material.

4. The environmentally sensitive structure of claim 3, wherein the bodies are characterized as nonspherical.

5. The environmentally sensitive structure of claim 3, wherein the plurality of bodies comprise major axes that are at least partially aligned with one another.

6. The environmentally sensitive structure of claim 3, wherein the bodies comprise fibers, platelets, tubes, or any combination thereof.

7. The environmentally sensitive structure of claim 2, wherein the matrix material is characterized as polymeric.

8. The environmentally sensitive structure of claim 2, wherein the matrix material is characterized as an elastomer, a hydrogel, or a thermoplastic.

9. The environmentally sensitive structure of claim 1, wherein the characteristic dimension is an aspect ratio of the bistable element.

10. The environmentally sensitive structure of claim 1, wherein the characteristic dimension changes by from about 1% to about 50% between the bistable shape and the monostable shape of the bistable element.

11. The environmentally sensitive structure of claim 1, wherein (a) the bistable shape has associated with it a first potential energy, (b) the monostable shape has associated with it a second potential energy, and (c) the conversion of the bistable element between the bistable shape and the monostable shape is effected by a potential energy in the bistable element that is from about 0.001% to about 99% greater than the greater of the first and second potential energies.

12. The environmentally sensitive structure of claim 1, wherein one of the bistable shape and the monostable shape is linear.

13. The environmentally sensitive structure of claim 1, wherein one of the bistable shape and the monostable shape comprises at least one non-linear portion.

14. The environmentally sensitive structure of claim 13, wherein one of the monostable shape and the bistable shape comprises a plurality of non-linear portions.

15. The environmentally sensitive structure of claim 1, wherein the environmental stimulus is one or more of an aqueous material, a hydrocarbon material, a temperature, a radiation, a mechanical stimulus, or any combination thereof.

16. The environmentally sensitive structure of claim 15, wherein the environmental stimulus is a hydrocarbon material.

17. The environmentally sensitive structure of claim 15, wherein the environmental stimulus is acidic.

18. The environmentally sensitive structure of claim 15, wherein the environmental stimulus is basic.

19. The environmentally sensitive structure of claim 1, wherein the conversion of the bistable element to a monostable shape effects motion of an element in mechanical communication with the bistable element, the element optionally being a hatch, a spring, a lever, or a rotary union.

20. The environmentally sensitive structure of claim 1, comprising a plurality of bistable elements.

21. A method, comprising exposing an environmentally sensitive structure according to claim 1 to the environmental stimulus so as to effect in the bistable element a conversion to a monostable element.

22. The method of claim 21, wherein the exposure effects motion of an element in mechanical communication with the bistable element.

23. A device, comprising a plurality of environmentally sensitive structures according to claim 1.

24. The device of claim 23, wherein the conversion to a monostable shape in different environmentally sensitive structures effects motion of different elements in mechanical communication with the different environmentally sensitive structures.

25. The device of claim 23, comprising a first environmentally sensitive structure and a second environmentally sensitive structure, the first environmentally sensitive structure and the second environmentally sensitive structure having different sensitivities to the same environmental stimulus.

* * * * *